United States Patent
Onishi et al.

(10) Patent No.: US 10,576,382 B2
(45) Date of Patent: Mar. 3, 2020

(54) GOLF GAME APPARATUS, STORAGE MEDIUM, GOLF GAME SYSTEM AND GOLF GAME CONTROL METHOD

(71) Applicant: NINTENDO CO., LTD., Kyoto (JP)

(72) Inventors: Yoshiaki Onishi, Kyoto (JP); Nobuo Matsumiya, Kyoto (JP); Shunsuke Matsushita, Kyoto (JP); Hiroshi Miyamoto, Tokyo (JP); Nobuya Ohashi, Tokyo (JP); Kazuhisa Watanabe, Nagoya (JP); Yuichi Mizobe, Nagoya (JP)

(73) Assignee: NINTENDO CO., LTD., Kyoto (JP)

( * ) Notice: Subject to any disclaimer, the term of this patent is extended or adjusted under 35 U.S.C. 154(b) by 167 days.

(21) Appl. No.: 15/415,038

(22) Filed: Jan. 25, 2017

(65) Prior Publication Data

US 2017/0216729 A1    Aug. 3, 2017

(30) Foreign Application Priority Data

Jan. 29, 2016   (JP) ................................. 2016-016648

(51) Int. Cl.
    *A63F 13/812*    (2014.01)
    *A63F 13/80*     (2014.01)
    (Continued)

(52) U.S. Cl.
    CPC .......... *A63F 13/812* (2014.09); *A63F 13/573* (2014.09); *A63F 13/80* (2014.09);
    (Continued)

(58) Field of Classification Search
    CPC ...... A63F 13/00; A63F 13/573; A63F 13/812; A63F 13/80
    (Continued)

(56) References Cited

U.S. PATENT DOCUMENTS

| 6,217,444 B1 * | 4/2001 | Kataoka ................. A63F 13/10 434/252 |
| 8,128,468 B2 * | 3/2012 | Takahashi ............... A63F 13/06 463/3 |

(Continued)

FOREIGN PATENT DOCUMENTS

| JP | 2002-52245 | 2/2002 |
| JP | 2004-290657 | 10/2004 |

(Continued)

OTHER PUBLICATIONS

Notification of Reasons for Refusal dated Jan. 14, 2020 issued in Japanese Application No. 2016-016648 (4 pgs.) and translation (4 pgs.).

(Continued)

*Primary Examiner* — Chase E Leichliter
(74) *Attorney, Agent, or Firm* — Nixon & Vanderhye P.C.

(57) ABSTRACT

A non-limiting example game apparatus includes a first LCD and a second LCD, a touch panel is provided on the second LCD. A pre-hitting operation screen is displayed on the second LCD, and a mark for designating a target landing point is displayed in this screen. A player designates a desired target landing point by moving the mark by a touch operation. A target shot power value for causing a ball to arrive the designated target landing point is calculated with using parameters set for a club that is currently selected. However, when the designated target landing point exceeds a position that the ball is hit using the club under selection with a maximum power value, the mark is moved to the position concerned and the maximum power value is set as a target shot power value.

14 Claims, 16 Drawing Sheets

(51) Int. Cl.
*A63F 13/573* (2014.01)
*G06F 3/0484* (2013.01)
*G06F 3/0488* (2013.01)
*G09G 3/36* (2006.01)

(52) U.S. Cl.
CPC ...... *G06F 3/04845* (2013.01); *G06F 3/04883* (2013.01); *G09G 3/36* (2013.01); *G09G 2354/00* (2013.01)

(58) Field of Classification Search
USPC ........................................... 463/1, 3
See application file for complete search history.

(56) References Cited

U.S. PATENT DOCUMENTS

| | | | | |
|---|---|---|---|---|
| 2004/0180709 | A1* | 9/2004 | Takahashi | A63F 13/10 463/3 |
| 2004/0214623 | A1* | 10/2004 | Takahashi | A63F 13/10 463/2 |
| 2006/0128468 | A1* | 6/2006 | Yoshikawa | A63F 13/10 463/36 |
| 2007/0262965 | A1* | 11/2007 | Hirai | B60R 11/0235 345/173 |
| 2010/0069153 | A1* | 3/2010 | Takahashi | A63F 13/06 463/32 |
| 2010/0099473 | A1* | 4/2010 | Ikejiri | A63B 69/36 463/3 |
| 2010/0203969 | A1 | 8/2010 | Takahashi et al. | |
| 2010/0248834 | A1* | 9/2010 | Suzuki | A63F 13/5375 463/36 |
| 2010/0248835 | A1* | 9/2010 | Suzuki | A63F 13/57 463/36 |
| 2010/0248836 | A1* | 9/2010 | Suzuki | A63F 13/02 463/36 |
| 2010/0248837 | A1* | 9/2010 | Suzuki | A63F 13/57 463/36 |
| 2012/0077557 | A1 | 3/2012 | Miki | |
| 2012/0309478 | A1* | 12/2012 | Kotsugai | A63F 13/426 463/3 |
| 2014/0274240 | A1* | 9/2014 | Meadows | A63F 13/216 463/3 |

FOREIGN PATENT DOCUMENTS

| | | |
|---|---|---|
| JP | 2012-70960 | 4/2012 |
| WO | 2009/020080 | 2/2009 |

OTHER PUBLICATIONS

Minna no GOLF 6, PlayStation Vita PlayStation3 Minna no GOLF 6 Official Guide Book published by Enterbrain, Inc. on Jan. 9, 2013, pp. 9 and 12 (4 pgs.).

* cited by examiner

HITTING OPERATION SCREEN WHEN SHOT POWER VALUE IS 100%

HITTING OPERATION SCREEN WHEN SHOT POWER VALUE IS 30%

GOLF GAME APPARATUS, STORAGE MEDIUM, GOLF GAME SYSTEM AND GOLF GAME CONTROL METHOD

CROSS REFERENCE OF RELATED APPLICATION

The disclosure of the patent application No. 2016-016648 filed on Jan. 29, 2016 is incorporated by reference.

FIELD

This application describes a golf game apparatus, a storage medium, a golf game system and a golf game control method, in which a golf is played in a virtual space according to an operation by a player.

SUMMARY

It is a primary object of an embodiment(s) to provide a novel golf game apparatus, storage medium, golf game system and golf game control method.

Moreover, it is another object of the embodiment(s) to provide a golf game apparatus, storage medium, golf game system and golf game control method, capable of setting a target position of a ball object after movement with a simple operation.

A first embodiment is a golf game apparatus, comprising a mark displaying portion, a determining portion, a first power calculating portion and a power displaying portion. The mark displaying portion is configured to display in an operation screen a mark for designating a target position of a ball object after movement in a virtual space. The determining portion is configured to determine a position of the mark according to an operation by a player. The first power calculating portion is configured to calculate, when the position of the mark is determined by the determining portion, a target shot power for moving the ball object to the position of the mark concerned, using a parameter that is set for a club object under selection and taking into account undulation of a terrain in the virtual space. Specifically, by taking into account a before movement position of the ball object and an after movement position in the virtual space, the target shot power is calculated so that the ball object is moved according to a movement trajectory following a parabola for causing the ball object to arrive this after movement position. Moreover, when the position of the mark is determined, a direction that the ball object is to be moved is also determined. That is, a direction of hitting the ball object is determined. The power displaying portion is configured to display the target shot power that is calculated by the first power calculating portion in a visibly-confirmable manner. Therefore, if determining the mark position, the player visibly confirms the calculated target shot power and performs a hitting operation according to the power.

According to the first embodiment, only by designating the target position of the ball object after movement, the hitting direction is determined and the target shot power is calculated, and therefore, it is possible set the target position of the ball object after movement with a simple operation.

A second embodiment is the golf game apparatus according to the first embodiment, further comprising an adjusting portion. The adjusting portion is configured to adjust the position of the mark when the target shot power that is calculated by the first power calculating portion exceeds a maximum value. That is, the position of the mark is moved to a position not exceeding the maximum value of the target shot power.

According to the second embodiment, since the position of the mark is adjusted when the target shot power that is calculated based on a moved mark position exceeds the maximum value, it is possible for the player to easily know that the target position designated by the player is a position that the target shot power exceeds the maximum value.

A third embodiment is the golf game apparatus according to the second embodiment, wherein the adjusting portion is configured to move the mark to a landing point or arrival position on a straight line that connects a current position of the ball object and the position of the mark at the time of hitting the ball object concerned by the target shot power of the maximum value using a club object. That is, the mark is moved to the landing point or arrival position at the time of hitting the ball object with the target shot power of the maximum value without changing the hitting direction of the ball object designated by the player.

In also the third embodiment, the player can easily know that the target position designated by the player is a position that the target shot power exceeds the maximum value. Moreover, since the direction of hitting the ball object is not changed from the direction that the player designated, the player can also shift to a hitting operation as it is.

A fourth embodiment is the golf game apparatus according to the first embodiment, further comprising a touch panel, wherein the determining portion is configured to move the position of the mark according to a touch operation to the touch panel.

According to the fourth embodiment, since the direction of hitting the ball object and the target shot power are calculated if the position of the mark is moved according to the touch operation, an operation is simple, and since the position of the mark after movement can be directly designated when providing the touch panel on an upper surface of a display device, an operation becomes simpler.

A fifth embodiment is the golf game apparatus according to the fourth embodiment, further comprising a hitting portion and a motion controlling portion. The hitting portion is configured to cause a player character to hit the ball object according to a slide operation that is performed by the player so as to be reciprocated on the touch panel. The motion controlling portion is configured to cause the player character to perform a swing motion in conjunction with the slide operation.

According to the fifth embodiment, the ball object can be hit by the slide operation, and in conjunction with this, the player character performs the swing motion, and therefore, it is possible to perform the slide operation so as to match the target shot power while seeing a size of a backswing of the player character. It is possible to feel like playing a real golf.

A sixth embodiment is the golf game apparatus according to the fifth embodiment, further comprising a second power calculating portion. The second power calculating portion is configured to calculate an actual shot power that causes the player character to hit the ball object according to a straight distance between a position where a slide direction is reversed in the slide operation and a hitting reference line. Since the player character performs the swing motion in conjunction with the slide operation, a swing direction is reversed from a backswing to a downswing when the slide direction is reversed.

According to the sixth embodiment, since the shot power is determined when the slide direction of the slide operation is reversed, it is possible to perform a hitting operation as such that a shot power is determined in the swing motion of the real golf.

A seventh embodiment is a non-transitory computer-readable storage medium storing a golf game control program to be executed by a computer provided with a display device, wherein the golf game control program causes one or more processors of the computer to perform: displaying, in an operation screen displayed on the display device, a mark for designating a target position of a ball object after movement in a virtual space; determining a position of the mark according to an operation by a player; calculating, when the position of the mark is determined in the determining, a target shot power for moving the ball object to the position of the mark concerned, using a parameter that is set for a club object under selection and taking into account undulation of a terrain in the virtual space; and displaying the target shot power that is calculated in the calculating in a visibly-confirmable manner on the display device.

An eighth embodiment is a golf game system, comprising: a mark displaying portion configured to display in an operation screen a mark for designating a target position of a ball object after movement in a virtual space; a determining portion configured to determine a position of the mark according to an operation by a player; a calculating portion configured to calculate, when the position of the mark is determined by the determining portion, a target shot power for moving the ball object to the position of the mark concerned, using a parameter that is set for a club object under selection and taking into account undulation of a terrain in the virtual space; and a power displaying portion configured to display the target shot power that is calculated in the calculating in a visibly-confirmable manner.

A ninth embodiment is a golf game control method using a computer provided with a display device, wherein the computer performs following steps: (a) displaying, in an operation screen displayed on the display device, a mark for designating a target position of a ball object after movement in a virtual space; (b) determining a position of the mark according to an operation of a player; (c) calculating, when the position of the mark is determined, a target shot power for moving the ball object to the position of the mark concerned, using a parameter that is set for a club object under selection and taking into account undulation of a terrain in the virtual space; and (d) displaying the target shot power that is calculated in the step (c) in a visibly-confirmable manner on the display device.

According to any one of the seventh to ninth embodiments, like the first embodiment, it is possible set the target position of the ball object after movement with a simple operation.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
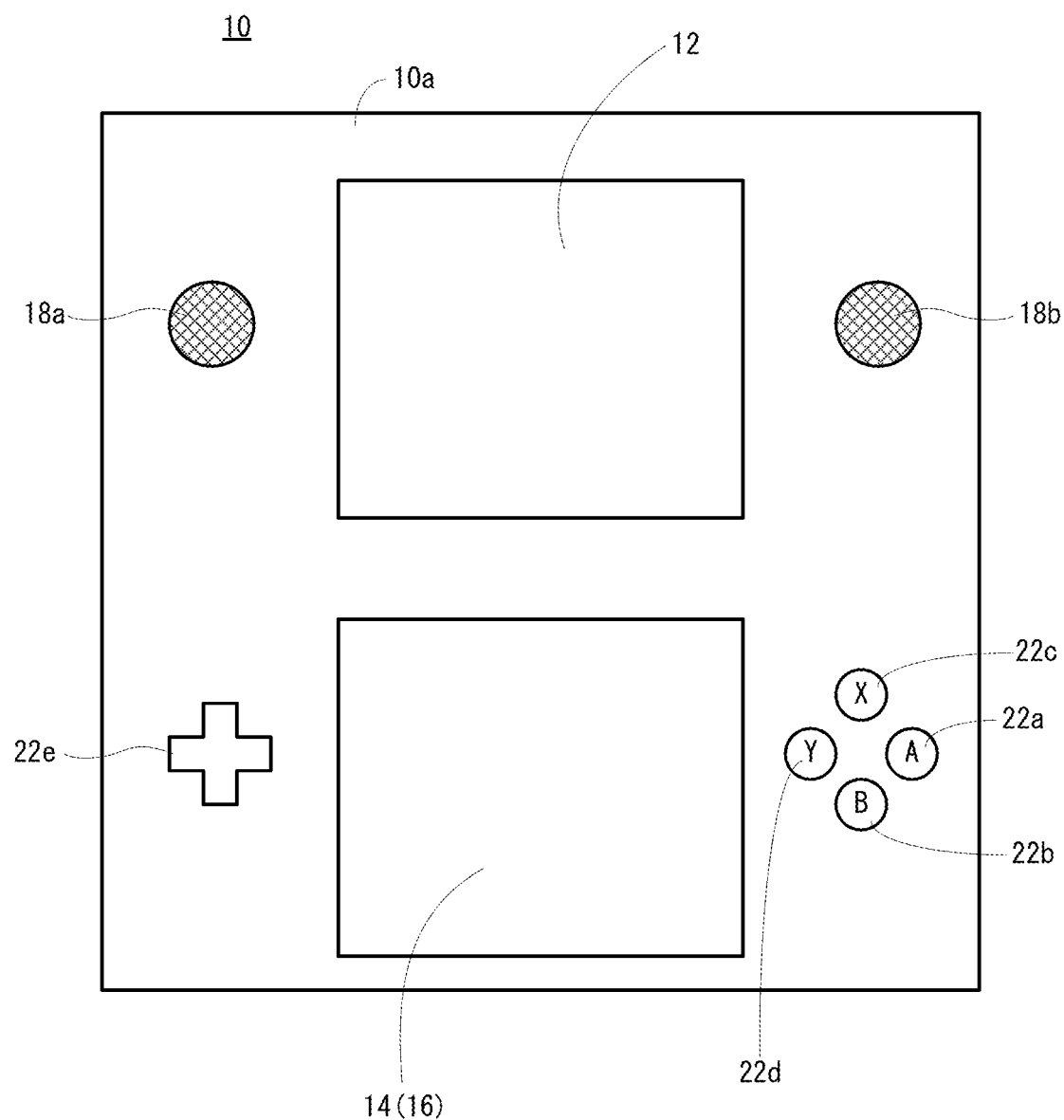
FIG. 1 is an illustration view showing a non-limiting example appearance configuration of a game apparatus of this embodiment.

With reference to FIG. 1, a game apparatus 10 of this embodiment is non-limiting example information processing apparatus or electronic equipment. This game apparatus 10 is a portable game apparatus, and includes a housing 10*a*. A first LCD 12 and a second LCD 14 are vertically arranged on a front surface of this housing 10*a*. Moreover, a touch panel 16 is provided on an upper surface of the second LCD 14. However, the touch panel 16 may be built into the second LCD 14. In this case, the second LCD 14 is a touch panel integrated-type display device.

Moreover, left and right speakers 18*a* and 18*b* are provided so as to sandwich the first LCD 12 on the housing 10*a*.

Furthermore, on the housing 10a, A, B, X and Y buttons 22a-22d are provided in a right side of the second LCD 14 and a cross key (button) 22e is provided in a left side of the second LCD 14.

Although illustration is omitted, the game apparatus 10 is provided with other operating buttons such as a power button. Moreover, a microphone or/and a camera may be provided as other input devices or sensors.

Moreover, the housing 10a (game apparatus 10) may be made foldable structure so that the first LCD12 and the second LCD14 face to each other.

Furthermore, although omitted in FIG. 1, a stick 24 like a stylus pen is provided as accessories of the game apparatus 10. A user or player (hereinafter, called simply "player") can perform a touch operation using a finger or the stick 24.

Figure 2:
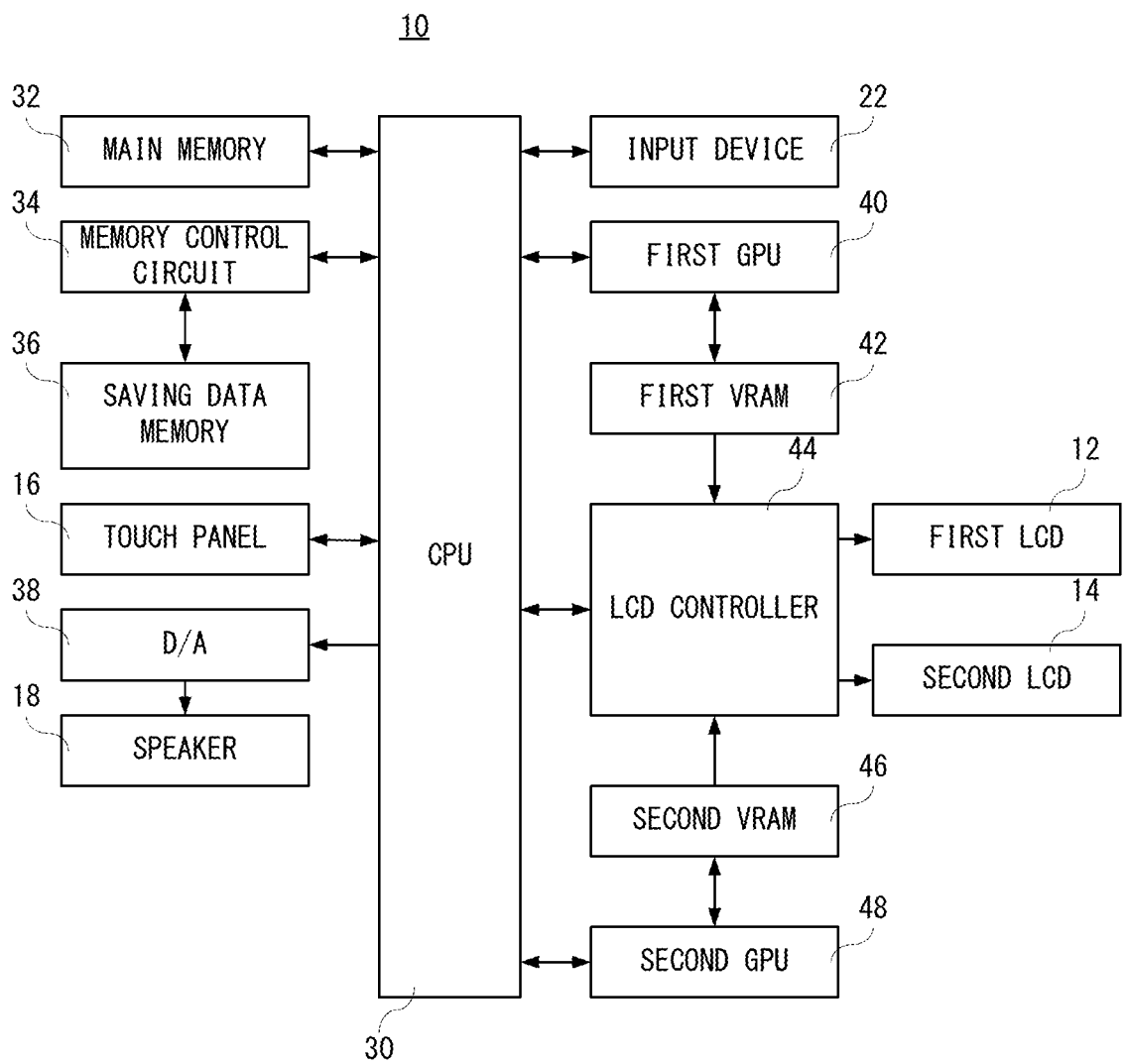
FIG. 2 is a block diagram showing non-limiting example electric structure of the game apparatus shown in FIG. 1.

FIG. 2 is a block diagram showing non-limiting example electric structure of the game apparatus 10 shown in FIG. 1. As shown in FIG. 2, the game apparatus 10 includes a CPU 30, and this CPU 30 is connected with the above-described touch panel 16 and an input device 22 (22a-22e etc.), and further connected with a main memory 32, a memory control circuit 34, a D/A converter 38, a first GPU (Graphics Processing Unit) 40, an LCD controller 44 and a second GPU 46. Moreover, a saving data memory 36 is connected to the memory control circuit 34. Furthermore, a first VRAM (Video RAM) 42 is connected between the first GPU 40 and the LCD controller 44, and a second VRAM 46 is connected between the second GPU 48 and the LCD controller 44. Furthermore, the above-described first LCD 12 and second LCD 14 are connected to the LCD controller 44.

The CPU 30 is information processing portion for executing a predetermined program (application program). In this embodiment, the predetermined program is stored in the main memory 32 of the game apparatus 10, and the CPU 30 performs information processing (golf game processing) described later through execution of the predetermined program concerned.

In addition, the predetermined program to be executed by the CPU 30 may be stored in advance in a memory (saving data memory 36), may be acquired from an external memory (memory card etc.) attachable to or detachable from the game apparatus 10, or may be acquired (downloaded) from a further apparatus through communication with the further apparatus when the game apparatus 10 is provided with a communication function. Moreover, as an information storage medium that stores the predetermined program, not only a non-volatile storage medium such as the saving data memory 36 but a CD-ROM, DVD and an optical disk-like storage medium similar to them may be used.

The touch panel 16 is a touch panel of a general-purpose electrostatic capacitance system, and outputs touch position (coordinates) data according to a touch input (touch operation) so as to apply it to the CPU 30. However, as the touch panel 16, a touch panel of other systems such as a resistance film system, an optical system (infrared system), etc. may be used.

The input device 22 includes various operating device such as the push buttons 22a-22d like the A, B, X and Y buttons, the cross button 22e, etc. The input device 22 outputs operation data indicative of an input situation (whether having been depressed, etc.) for each button so as to apply it to the CPU 30. The CPU 30 acquires the touch position data or/and the operation data, and performs processing according to the touch position data or/and the operation data acquired.

The main memory 32 is a memory device that is used as a working area and a buffer area for the CPU 30. More specifically, the main memory 32 stores (temporary stores) various data used for the above-described information processing, and stores programs acquired from exteriors (a memory card or other equipment). In this embodiment, as the main memory 32, a PSRAM (Pseudo-SRAM) is used, for example.

The saving data memory 36 is a memory device for storing data etc. such as a program(s) to be executed by the CPU 30, game data, etc. This saving data memory 36 is constituted by a non-volatile storage medium, and a NAND flash memory can be used for it, for example. The memory control circuit 34 controls reading or writing of data from or to the saving data memory 36 according to an instruction of the CPU 30.

The D/A converter 38 is a digital/analog converter that converts sound data applied from the CPU 30 into an analog game sound, and outputs it to the speaker 18. In addition, the game sound means a voice or sound necessary for games, such as imitation sounds for game characters or objects, sound effects, music (BGM). Moreover, the speaker 18 is the speaker 18a and the speaker 18b shown in FIG. 1. Although the same sound signal is output to the speaker 18a and the speaker 18b in FIG. 2, a left-side sound signal and a right-side sound signal may be applied to the speaker 18a and the speaker 18b, respectively.

The first GPU 40 produces, according to an instruction from the CPU 30, a first display image based on data (image producing data 304a: see FIG. 11) that is for producing a display image and stored in the main memory 32, and draws the first display image in the first VRAM 42. In a similar manner, the second GPU 48 produces a second display image according to instructions from the CPU 30, and draws the second display image to the second VRAM 46.

The LCD controller 44 outputs the first display image drawn by first VRAM 42 to first LCD 12, and outputs the second display image drawn by second VRAM 46 to second LCD 14.

In addition, although an LCD is used as a display device in this embodiment, instead of an LCD, an EL (Electronic Luminescence) display, a plasma display, etc. may be used. Moreover, a display device having arbitrary resolution can be used for the game apparatus 10. Furthermore, the LCD controller 44 may output the first display image to the second LCD 14, and may output the second display image to the first LCD 12.

In addition, the electric structure of the game apparatus 10 shown in FIG. 2 is a mere example, and it does not need to be limited to this.

Figure 3:
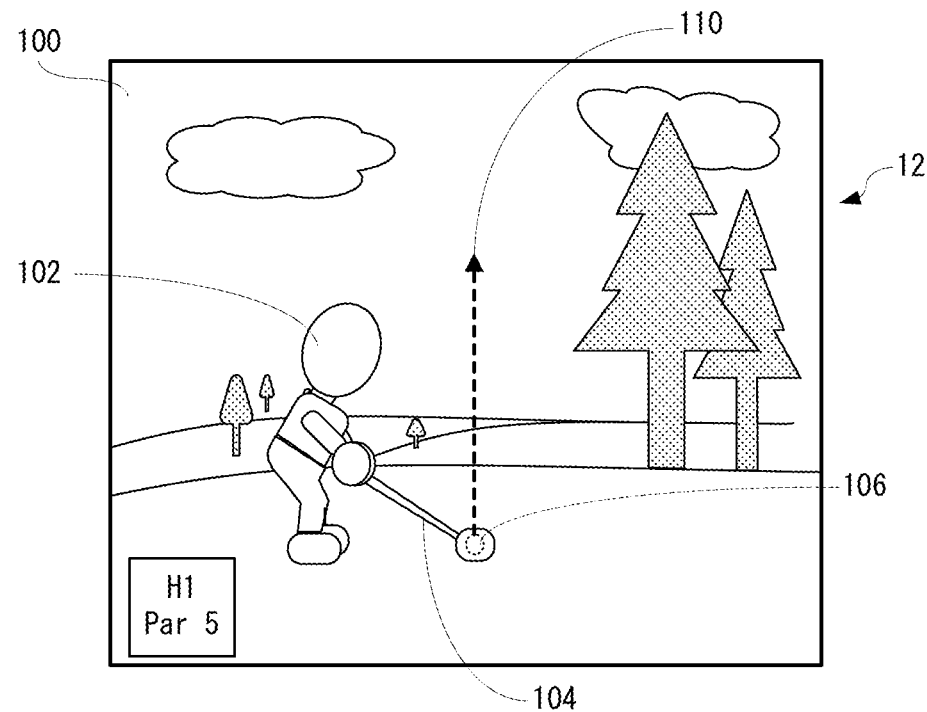
FIG. 3 is an illustration view showing non-limiting example game screen and pre-hitting operation screen displayed on a display device of the game apparatus shown in FIG. 1.
Figure 3:
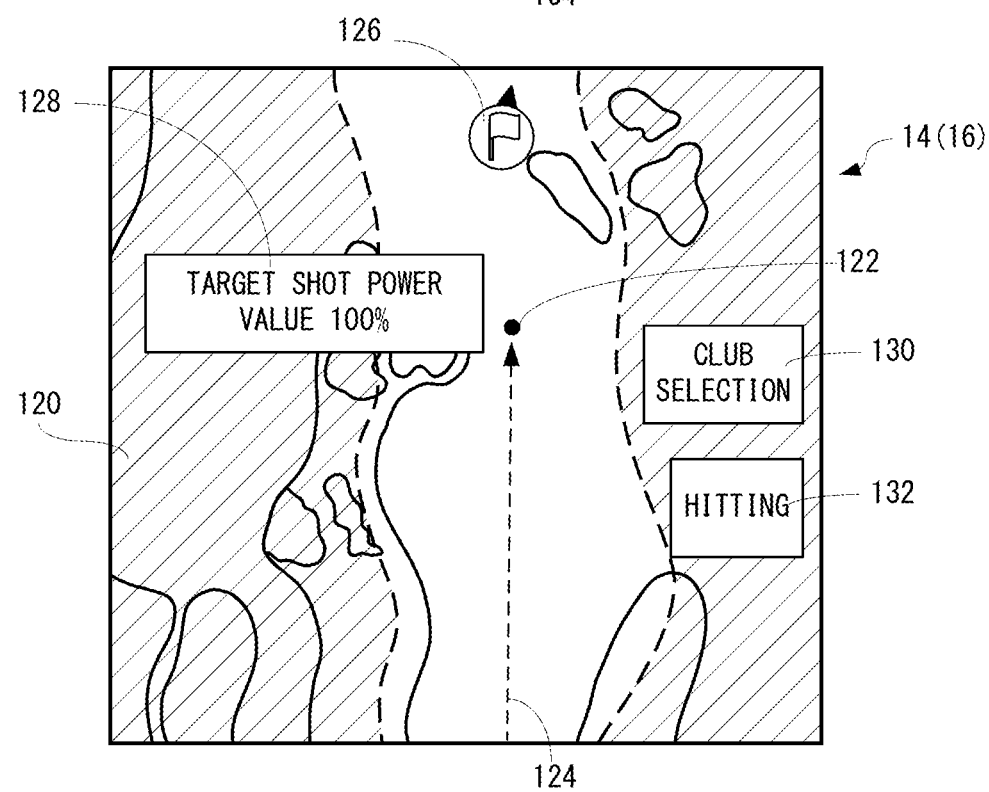

FIG. 3 is an illustration view showing examples of a game screen 100 that is displayed on the first LCD 12 of the game apparatus 10 of this embodiment and a pre-hitting operation screen 120 that is displayed on the second LCD 14.

As shown in FIG. 3, in the game screen 100 displayed on the first LCD 12, a player character 102 is displayed in the center or approximately center thereof, and a part of a golf course (hole) is displayed as a background. More specifically, a virtual camera (not shown) is set behind the player character 102, and the player character 102 and a part of the virtual golf course provided in a three-dimensional virtual space is photographed by the virtual camera, and a photography image is displayed as the game screen 100.

Moreover, in the game screen 100, a state where the player character 102 enters in a posture (address) to hit an object of a golf ball (hereinafter, simply called "ball") 106 is indicated. Furthermore, there is displayed with a predicted movement trajectory 110 in a case where the ball 106 is hit with a target shot power value (here, 100%) by using an object of a golf club (hereinafter, simply called "club") 104 that is currently selected. In this golf game, the ball 106 being hit jumps out at an initial velocity according to a shot power value in a direction (elevation angle) according to a loft angle that is determined for a kind of the club 104 to be used, and is moved in the virtual space so as to draw a parabola.

The game screen 100 is changed in accordance with operations of the player using the pre-hitting operation screen 120 and a hitting operation screen 200 both described later, and mainly displays an animation that the player character 102 swings the club 104 and hits the ball 106 and the ball 106 is moved (flies, rolls, cups-in, etc.), and displays an image of the ball 106 and the golf course photographed by the virtual camera when the ball 106 is moved and thus the virtual camera is moved following the ball 106, and so on.

The pre-hitting operation screen 120 is for performing advance setting such as club selection before the player performs an operation that causes the player character 102 to hit (shoot) the ball 106. A map that a part of the golf course (hole) under play viewed from above is displayed in this pre-hitting operation screen 120 as a background. In addition, in the pre-hitting operation screen 120 shown in FIG. 3, an area other than the hole under play is an OB (out of bounds: play prohibition area), and the area is shown by hatching on the map. In the following, the same may be applied to other drawings.

Moreover, in the pre-hitting operation screen 120, a mark (target) 122 for setting (designating) a target landing point is displayed, and a part of a predicted movement trajectory 124 from a current position of the ball 106 in a case where the ball 106 is hit toward this mark 122 is displayed. In addition, this predicted movement trajectory 124 is the same as the predicted movement trajectory 110 of the game screen 100 displayed on the first LCD 12, but a viewing position (position of the virtual camera) and a viewing direction (direction of the virtual camera) differ. Moreover, a pointing image 126 for pointing a direction of a pin is displayed in an upper part of the pre-hitting operation screen 120.

Furthermore, near the mark 122, an indicator portion 128 that indicates a numerical value of a current target shot power value is provided (displayed). In addition, if the target shot power value is updated, an indicative content of the indicator portion 128 is also updated.

Furthermore, an icon 130 and an icon 132 are provided in a right end portion of the pre-hitting operation screen 120. The icon 130 is an icon for selecting another club 104. Moreover, the icon 132 is an icon for shifting to a hitting operation.

Although a detailed description is omitted, the club 104 is changed (selected) at every time the icon 130 is touched (operated) in an order of flying distance. If the touch of the icon 130 is ended, a club 104 that is selected when ended is set (selected) as a club 104 that the player character 102 uses. However, if the icon 130 is touched, a screen for selecting club 104 is displayed, whereby a club 104 can be selected in such the screen.

For example, in this embodiment, the player sets (designates), by moving the mark 122, a position or place that he/she wants to move (land) the ball 106. That is, it is possible to designate (determine) a direction hitting the ball 106 and a flying distance (in this embodiment, a target shot power value). In this embodiment, the mark 122 is moved according to a touch operation. However, the mark 122 may be moved according to an operation of the cross button 22e.

Figure 4:
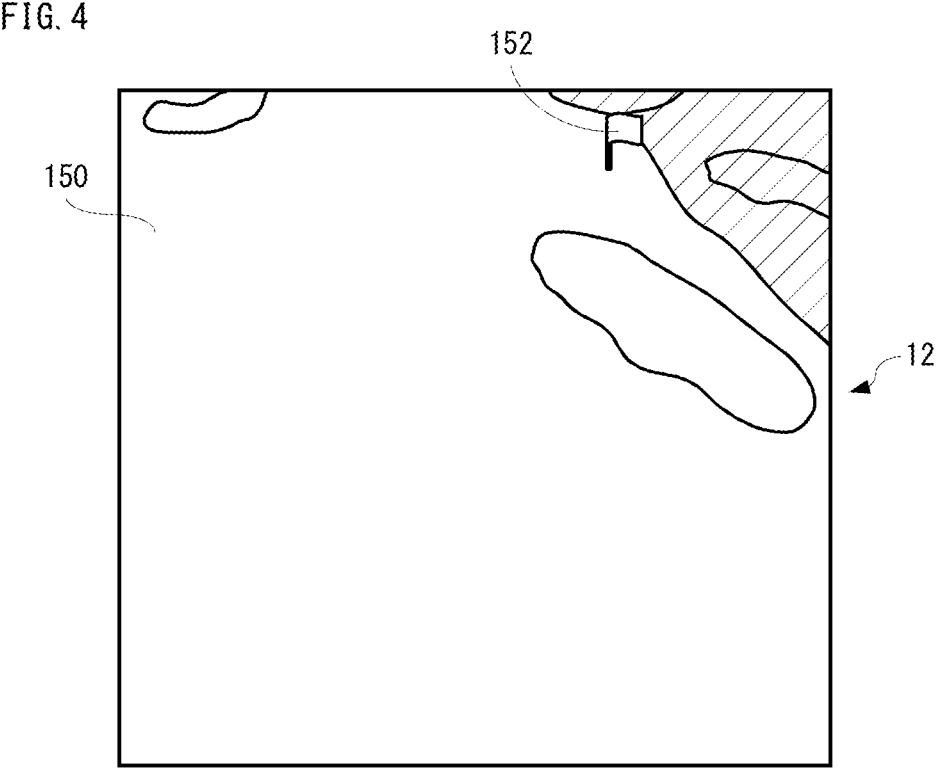
FIG. 4 is an illustration view showing further non-limiting example game screen and pre-hitting operation screen displayed on the display device of the game apparatus shown in FIG. 1.
Figure 4:
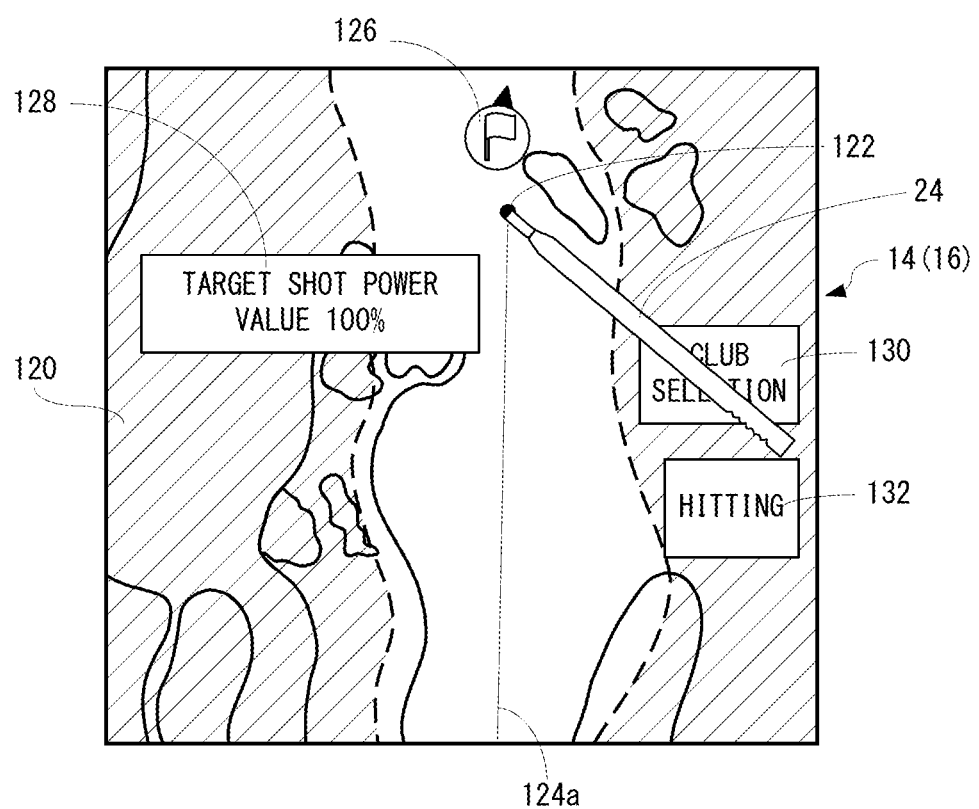
Figure 5:
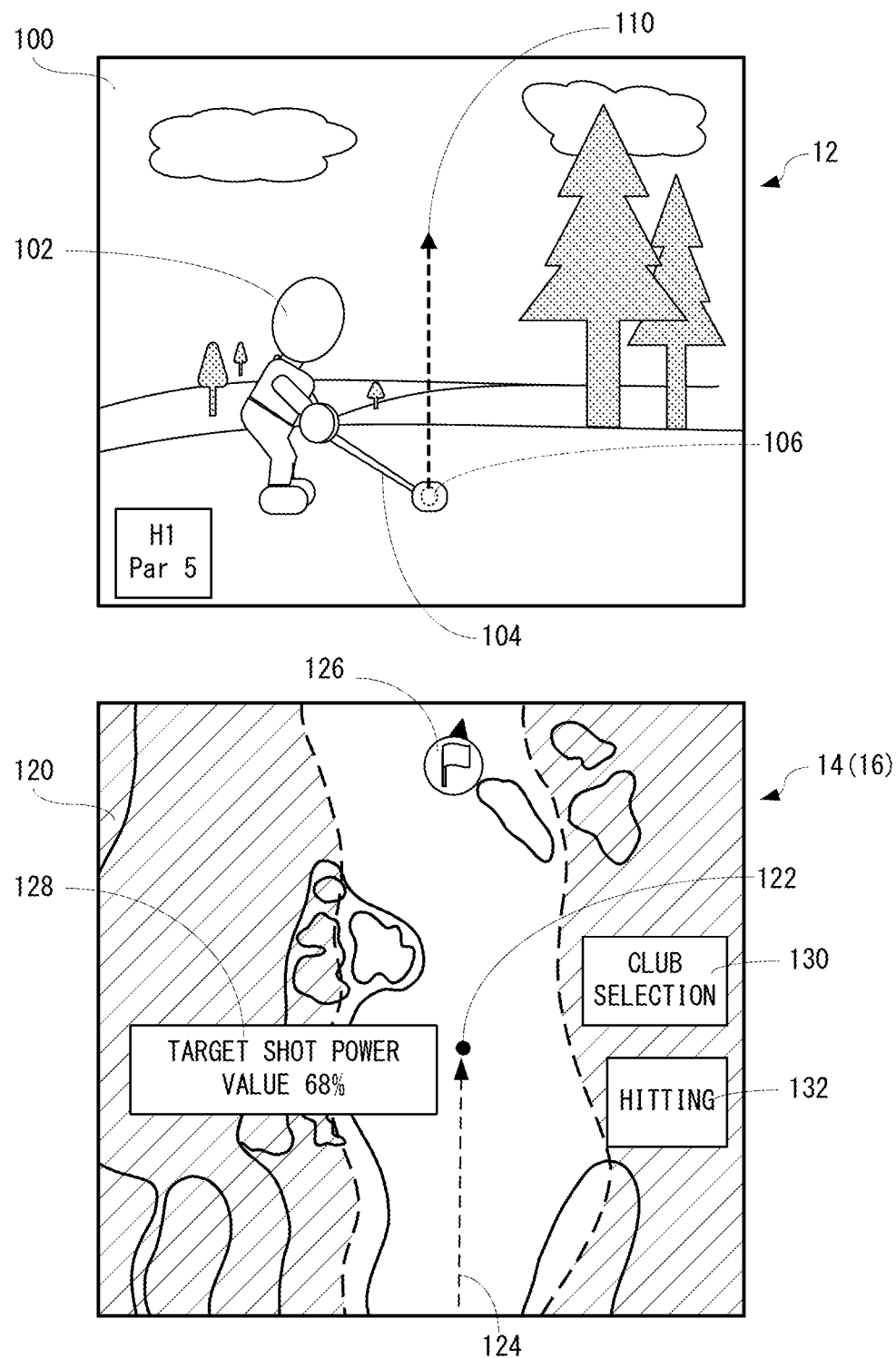
FIG. 5 is an illustration view showing still further non-limiting example game screen and pre-hitting operation screen displayed on the display device of the game apparatus shown in FIG. 1.

FIG. 4 shows other examples of the game screen 150 in the middle of moving the mark 122 and the pre-hitting operation screen 120. FIG. 5 shows other examples of the game screen 100 after moving the mark 122 and the pre-hitting operation screen 120.

As shown in FIG. 4, in the pre-hitting operation screen 120 displayed on second LCD 14, the mark 122 is moved according to the touch operation of the player, and during movement of the mark 122, a straight line 124a that connects the current position of the ball 106 and the position of the mark 122 is displayed instead of the predicted movement trajectory 124. At this time, on the first LCD 12, an image viewing from diagonally above the current position of the mark 122 and a part of the course that the circumstance thereof is enlarged in a bird's eye view is displayed as the game screen 150. Moreover, a pointing image 152 for pointing a direction of the pin (cup) is displayed in this game screen 150. That is, the pointing image 152 is arranged on a straight line that connects the current position of the ball 106 and a position of the pin.

If the player determines a target landing point and touches-off the mark 122 at the determined position, a position of the mark 122 after movement is determined, and a shot power value (target shot power value) for moving (flying) the ball 106 to the target landing point and a predicted movement trajectory 110 (124) from the current position of the ball 106 to the target landing point are calculated at the time of hitting the ball 106 with the club 104 that is currently selected.

Figure 11:
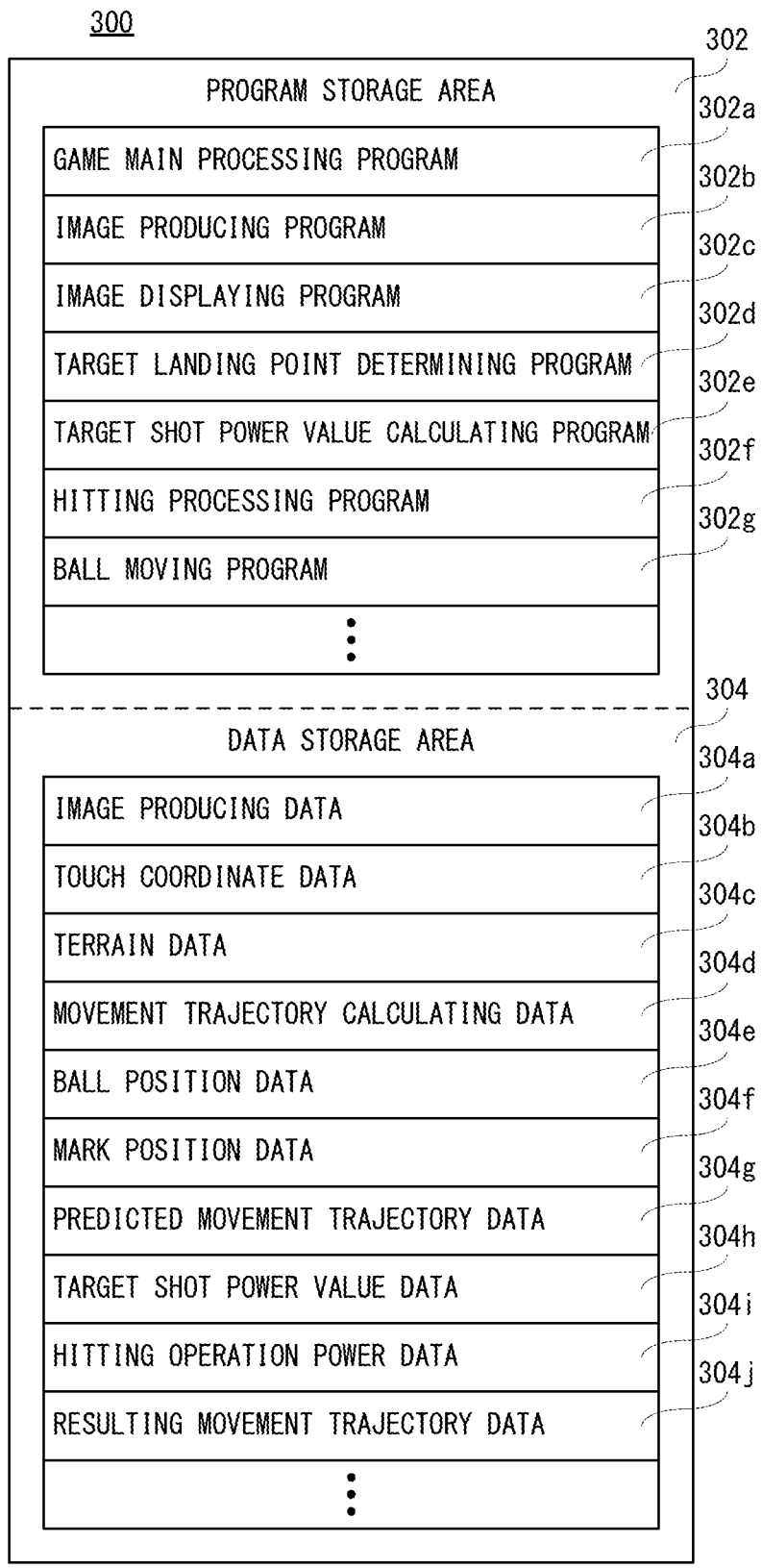
FIG. 11 is an illustration view showing a non-limiting example memory map of a main memory incorporated in the game apparatus shown in FIG. 2.

However, the moved position of the mark 122 is determined by acquiring the position (terrain) of the course corresponding to the position where the mark 122 concerned is displayed (placed) from terrain data 304c (see FIG. 11).

Moreover, in the golf game, the gravity acceleration (g) in the virtual space and the mass (m) of the ball 106 are set in advance by a designer or programmer. Furthermore, a hitting angle (elevation angle) of the ball 106 and initial velocity $v_{0max}$ of the ball 106 in a case where the shot power value of the ball 106 is 100% (full shot) are set or each club 104 in advance according to a kind of the club.

Specifically, the initial velocity $v_0$ required for making the ball 106 arrive the target landing point is calculated by using an equation (1) about a trajectory of an oblique projection motion, and then, the target shot power value is calculated (determined) by calculating a percentage (%) of the calculated initial velocity $v_0$ to the initial velocity $v_{0max}$ of a case of the full shot. Moreover, the predicted movement trajectory (path) 110 (124) is also calculated according to the equation (1) by using the calculated initial velocity $v_0$. In addition, the equation (1) is calculated by eliminating a component of time (t) in an equation about a position of the oblique projection motion shown in an equation (2).

However, a local coordinate is set when calculating the target shot power value and the predicted movement trajectory 110 (124). Specifically, a reference (origin) is set to the current position of the ball 106, and an axis extending horizontally from the current position of the ball 106 toward the target landing point is set as an x axis, and an axis perpendicular to the x axis and extending in a direction of a height of the virtual space is set as a y axis. Moreover, a direction extending horizontally toward the target landing point from the current position of the ball 106 is set in a plus direction of the x axis, and a direction toward an upper portion in the virtual space is set in a plus direction of the y axis.

$$\text{Path } y = \tan\theta * x - (gx^2)/(2v_0^2 \cos^2\theta) \quad (1)$$

$$\text{Position } x=v_0 \cos\theta * t \quad y=v_0 \sin\theta-(gt^2)/2 \quad (2)$$

When calculating the target shot power value and the predicted movement trajectory (path) 110 (124), as shown in the equation (1), a height difference (position y) between the current position of the ball 106 and the position of the target landing point is also taken into account. That is, the undulation of the terrain is taken into consideration.

Figure 6A:
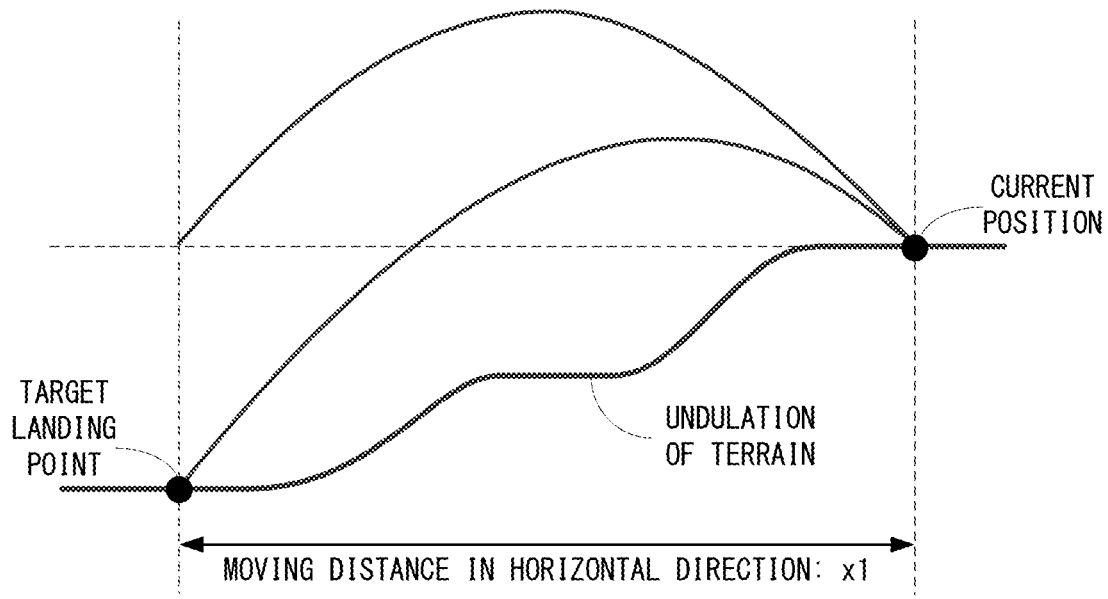
FIG. 6(A) is an illustration view showing a required shot power in a case where a target landing point is in a position lower than a current position of a ball.
Figure 6B:
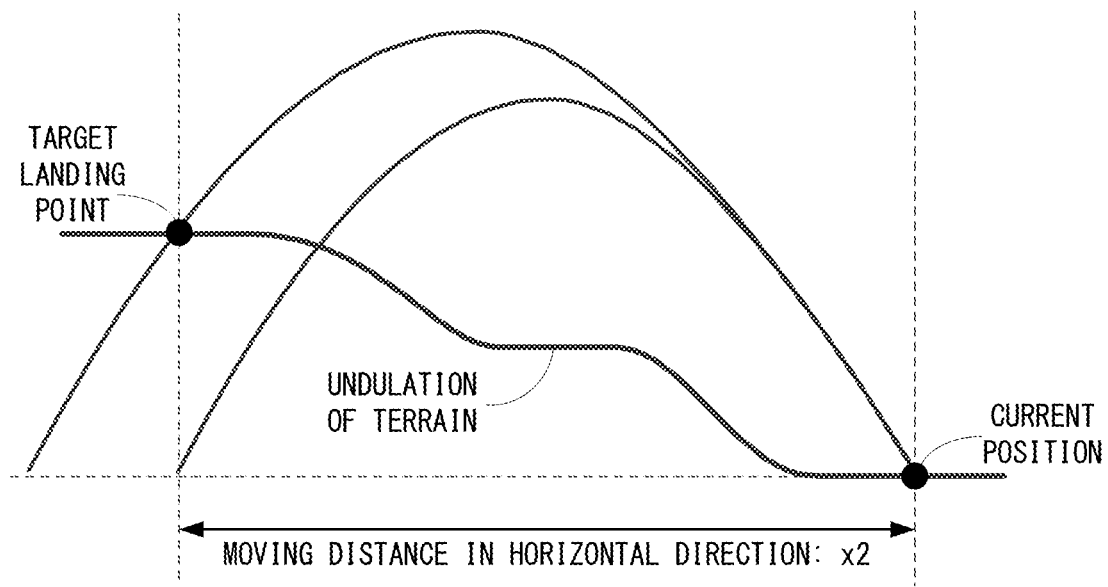
FIG. 6(B) is an illustration view showing a required shot power in a case where a target landing point is in a position higher than a current position of a ball.

For such a reason, when the position of the target landing point is lower than the current position of the ball 106 as shown in FIG. 6 (A), the shot power value required to move the ball 106 by a moving distance x1 in a horizontal direction is small as compared with a case where these heights are the same. In addition, FIG. 6 (A) shows a case where the same club 104 is used. Moreover, in FIG. 6(A) (in FIG. 6(B) is also the same), a curve shows only the undulation of the terrain concerned in a cross section cutting a part of a certain course (terrain) provided in the virtual space with a straight line passing the current position of the ball 106 and the target landing point. However, in FIG. 6(A) (in FIG. 6(B) is also the same), the path (movement trajectory) viewing the ball 106 from a side of a moving direction thereof is shown by the parabola.

On the other hand, when the position of a target landing point is higher than the current position of the ball 106 as shown in FIG. 6(B), the shot power value required to move the ball 106 by a moving distance x2 in a horizontal direction is large as compared with a case where these heights are the same. However, FIG. 6(B) shows a case where the same club 104 (club 104 different from that in FIG. 6(A)) is used.

Therefore, in this embodiment, if the mark 122 (target landing point) is changed (designated) by moving the mark 122 and touching-off the mark 122 is touched-off, a landing point at the time of hitting the ball 106 with the largest shot power value (maximum value) using the club 104 that is currently selected is calculated on the straight line connecting the current position of the ball 106 and the target landing point. That is, a landing point when hitting the ball 106 at the maximum value (full shot) of the shot power value in a direction toward the target landing point is calculated. However, the maximum value is the largest shot power value, and it is set at 100% in this embodiment. Therefore, as described later, the player can input a shot power value within a limit of 100%.

Then, when the calculated landing point (landing point of a case of the full shot) exceeds a target landing point, that is, when a horizontal distance from the current position of the ball 106 to the target landing point is longer than a horizontal distance from the current position of the ball 106 to the landing point of the case of the full shot, since the target shot power value exceeds the maximum value, in this embodiment, the position of the mark 122 is moved to the position of the calculated landing point. That is, the position of the mark 122 is adjusted (corrected) automatically. Since the position of the mark 122 is thus adjusted automatically, the player can know easily that the target shot power for making the ball 106 arrive the designated target landing point becomes over 100%. Moreover, when the position of the mark 122 is adjusted, an indicator portion 128 is displayed near this mark 122, and it is indicated (described) in this indicator portion 128 that the target shot power value is 100%.

However, since the position of the mark 122 is adjusted on the straight line that connects the current position of the ball 106 and the target landing point, a direction that the ball 106 is to be hit, which is determined by the position of the mark 122 designated by the player, is not changed. Therefore, the player can shift to the hitting operation directly after the position of the mark 122 is adjusted automatically.

Moreover, when the landing point of the case of the full shot does not exceed the target landing point, that is, when a horizontal distance from the current position of the ball 106 to the target landing point is shorter than the horizontal distance from the current position of the ball 106 to the landing point of the case of the full shot, a target shot power value making the ball 106 land at the target landing point is calculated. By calculating a position (x, y) of the target landing point when the current position of the ball 106 is the reference (origin), and by substituting this position (x, y), the elevation angle θ when the club 104 that is currently selected is used and the gravity acceleration (g) into the equation (1) for calculating the path, the initial velocity $v_0$ can be calculated. A target shot power value can be calculated by calculating a percentage (%) of this initial velocity $v_0$ to the initial velocity $v_{0max}$ in the case of the full shot. If the target shot power value is calculated, near the mark 122, the indicator portion 128 is displayed and the calculated target shot power value is indicated (described) in this indicator portion 128. In this case, when the target shot power value and the movement trajectory are calculated, for example, the pre-hitting operation screen 120 as shown in FIG. 5 is displayed on the second LCD 14. At this time, the game screen 100 as shown in FIG. 3 is displayed on the first LCD 12. That is, the game screen 100 returns to a screen that the player character 102 is in an address state.

In addition, when the landing point of the case of the full shot corresponds to the target landing point, since there is no necessity of adjusting the target landing point and it is also unnecessary to recalculate the target shot power value, the indicator portion 128 with a description that the target shot power value is 100% is displayed near the mark 122.

If a target shot power value is calculated or determined and the initial velocity $v_0$ of the ball 106 is calculated or determined according to this, a predicted movement trajectory 110 (124) can be calculated using the equation (1) for calculating the path. However, a predicted movement trajectory 110 (124) can also be calculated by evaluating a position at each predetermined time using the equation (2) for calculating the position.

Thus, it is possible to change (designate) a direction that is the ball 106 is hit by changing the position of the mark 122, and further, a target shot power value and a predicted movement trajectory 110 (124) are calculated. However, since the predicted movement trajectory 110 (124) is calculated by the local coordinate on the basis of the current position of the ball 106, the calculated predicted movement trajectory 110 (124) is changed into the world coordinate that is set in the virtual space.

In addition, although illustration is omitted, when the predicted movement trajectory 110 (124) hits to a tree or/and other obstacle in the course, the mark 122 is displayed in a position where it hits, and a warning (information) is issued so that the player can know this. For example, in the pre-hitting operation screen 120, a warning message of being hit is displayed near the mark 122, or a sign or symbol showing that it hits is displayed near or around the mark 122. Similarly, in the game screen 100, a mark showing a position where it hits is displayed, and a warning message of being hit is displayed near this mark, or a symbol or sign showing that it hits is displayed near or around this mark. By such a warning, the player can select to change of the target landing point or/and to change of the kind of club 104.

Figure 7:
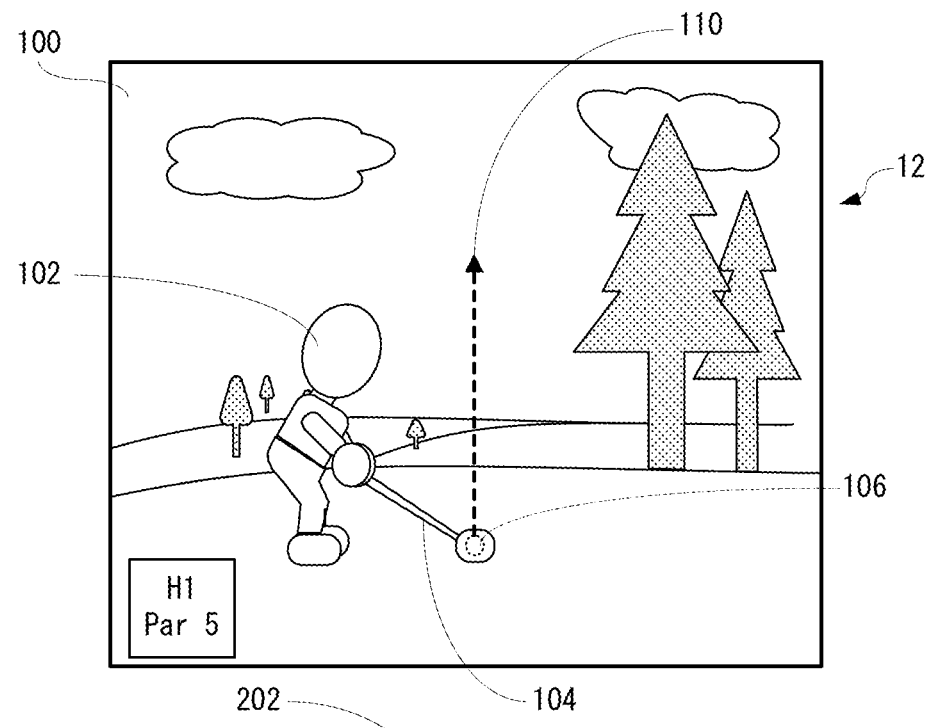
FIG. 7 is an illustration view showing non-limiting example game screen and hitting operation screen displayed on the display device of the game apparatus shown in FIG. 1.
Figure 7:
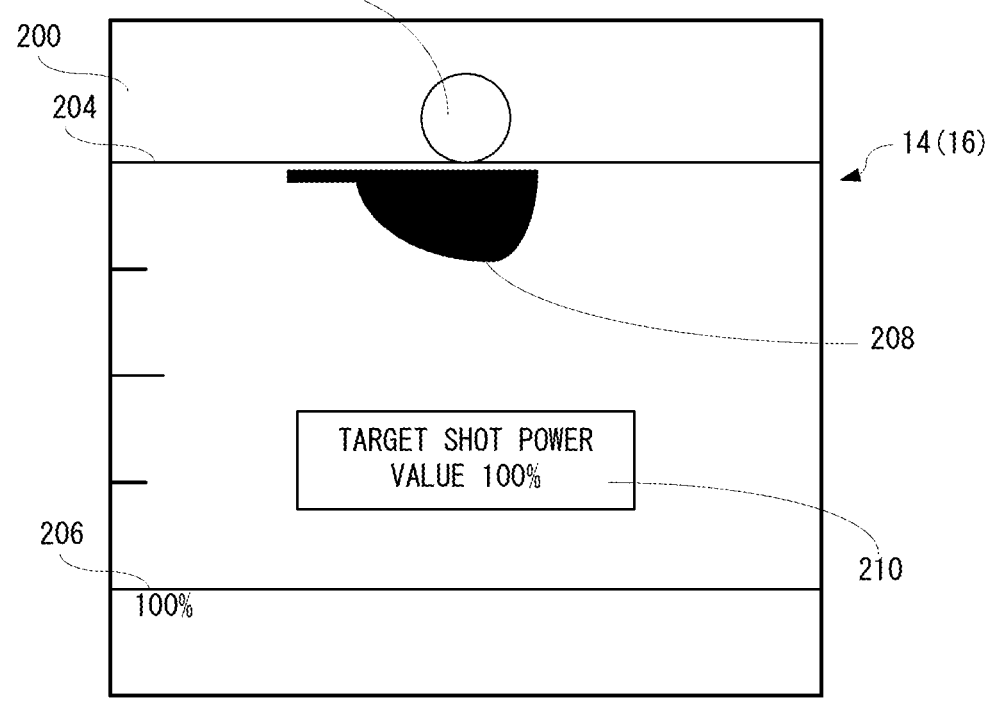
Figure 7:
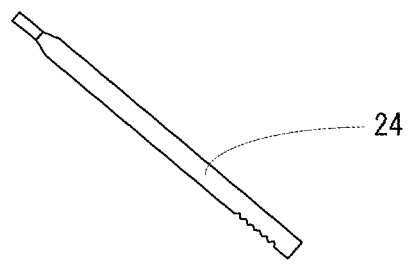

If the player inputs an instruction of a hitting operation by touching the icon 132 in the pre-hitting operation screen 120 after ending selection of the club 104 and setting-up (designation) of the target landing point, as shown in FIG. 7, the hitting operation screen 200 is displayed on the second LCD 14. Although the same game screen 100 before inputting the instruction of hitting operation is displayed on the first display 12, as described above, if the club 104 to be used is changed in the pre-hitting operation screen 120, an image of the club 104 is changed, and if the mark 122 (position of the target landing point) is changed in the pre-hitting operation screen 120, the direction of the player character 102 or/and the predicted movement trajectory 110 is changed.

A ball 202 that is different from the ball 106 (hereinafter, called "target ball" for convenience of description) is displayed in an upper portion in the center of screen in the hitting operation screen 200 as shown in FIG. 7. Specifically, the target ball 202 is displayed in a manner that it is brought into contact with an impact line 204 and above this impact line 204.

The target ball 202 is a target (predetermined area) for passing or hitting by a slide operation. Moreover, the impact line 204 is a reference line for determining whether the player character 102 hits the ball 106 in the hitting operation.

Moreover, a full shot line 206 that shows a maximum value (100%) of power (shot power value) when the player character 102 hits the ball 106 is displayed in the pre-hitting operation screen 200. Furthermore, an image 208 of the club 104 or a club head is displayed blow the target ball 202 and the impact line 204 in the hitting operation screen 200. Then, the hitting operation screen 200 is provided (displayed) with the indicator portion 210 in which the target shot power value for causing the ball 106 to land at the target landing point previously set is written in a lower center of the screen. When the player starts a hitting operation, this indicator portion 210 becomes to be non-displayed (see FIG. 8).

In addition, in the hitting operation screen 200, a scale obtained by dividing the shot power value at every predetermined rate (25%) between the impact line 204 and the full shot line 206 is displayed in a left end portion of the screen.

In this embodiment, as described above, the player can cause the player character 102 that is displayed in the game screen 100 to hit the ball 106 by performing a touch operation in the hitting operation screen 200 (touch panel 16).

Next, a displaying example and an example of the touch operation of the hitting operation screen 200 in causing the player character 102 to hit the ball 106 will be specifically described using the drawings.

Figure 8:
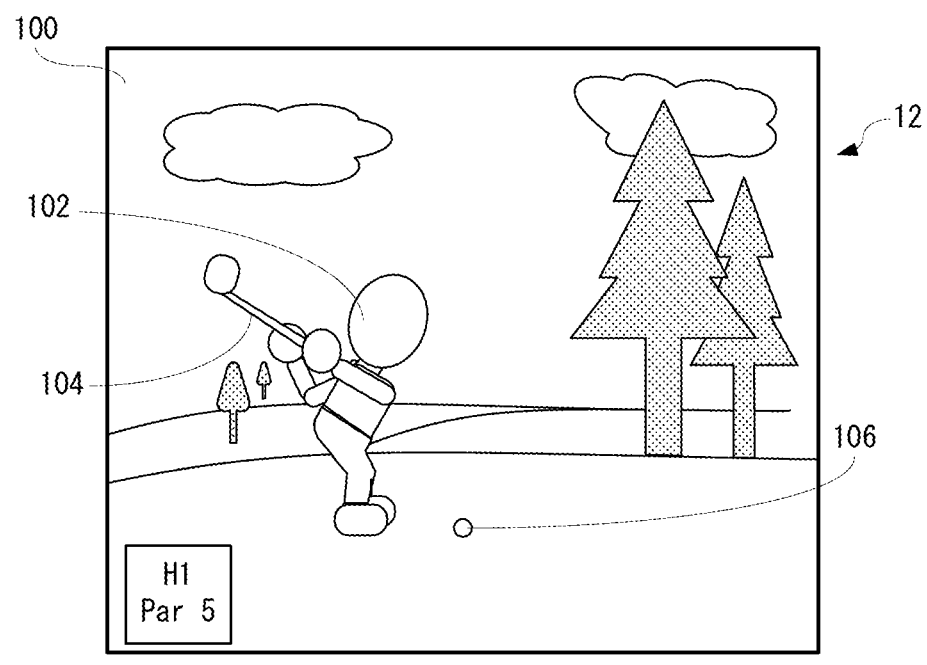
FIG. 8 is an illustration view showing further non-limiting example game screen and hitting operation screen displayed on the display device of the game apparatus shown in FIG. 1.
Figure 8:
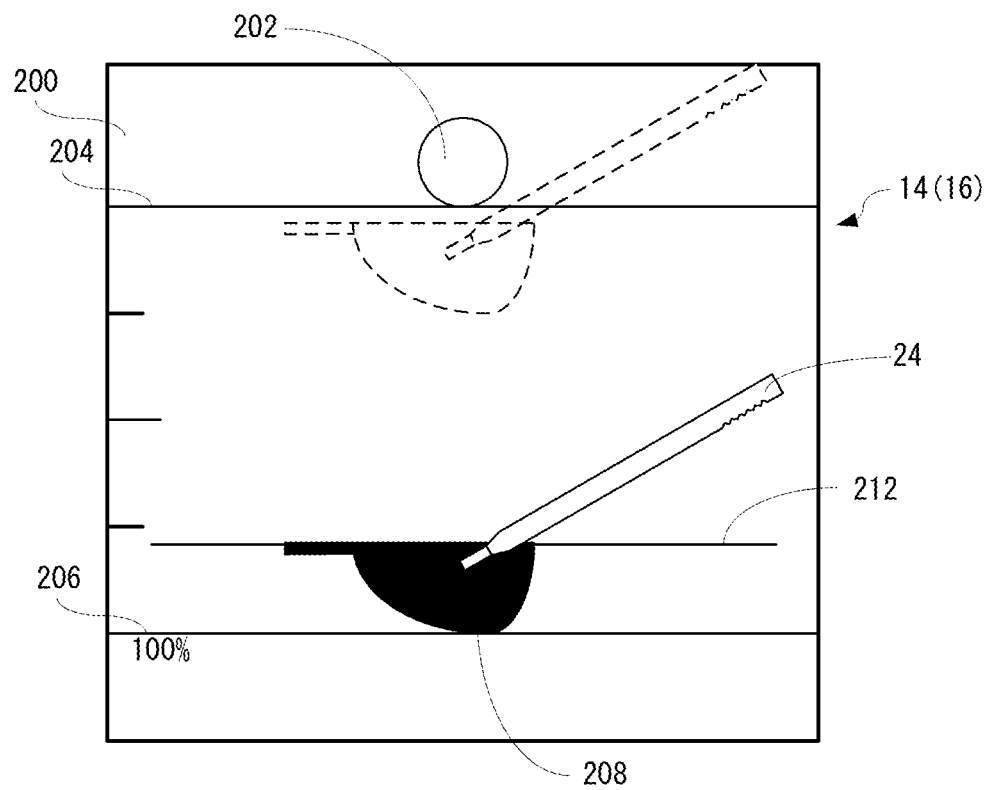

As shown in FIG. 8, the player touches the image 208 in the hitting operation screen 200 using the stick 24, and slides toward the full shot line 206 (downward in this embodiment). Then, according to this slide operation, an animation that the player character 102 performs a backswing is displayed in the game screen 100 on the first LCD 12. That is, the player character 102 performs a swing motion in conjunction with the slide operation. Therefore, it is also possible to adjust a shot power by seeing a size of the backswing of the player character 102. Therefore, the player can obtain a bodily sensation like actually playing the golf.

In addition, since the two-dimensional coordinate system is set on a displaying surface of the second LCD 14 and a detecting surface of the touch panel 16, a direction of the slide operation can be known by detecting increase or decrease of either one of the two-dimensional components of the detected touch coordinates.

If the player starts a downward slide while touching the image 208, an auxiliary line 212 is displayed on an upper end portion of the image 208 corresponding to the face of the club 104. The player performs the slide operation downward up to a position corresponding to a desired shot power value (target shot power value, for example) while taking into account this auxiliary line 212, the impact line 204, the full shot line 206 and the scale in the left end portion, and reverses the direction of the slide operation when the slide reaches the position corresponding to the desired shot power value. At this time, the shot power value by the slide operation is determined.

Commonly, in the real golf, when the swing direction is reversed to a downswing from a backswing, a size of the backswing is determined, whereby an approximate shot power can be determined.

As described above, since the player character 102 is caused to perform a swing motion in conjunction with the slide operation, when the slide direction is reversed, a direction is reversed to the downswing from the backswing. Therefore, the player can perform a hitting operation like that a shot power is determined by a swing in the real golf As described above, in this embodiment, a shot power value is determined according to a position at the time of reversing the slide direction. Specifically, a shot power value is determined by a rate of a straight distance between the impact line 204 and a position at the time of reversing the slide direction to a straight distance between the impact line 204 and the full shot line 206. However, the straight distance between the impact line 204 and the full shot line 206 is the maximum value (100%) of the shot power value.

Figure 9A:
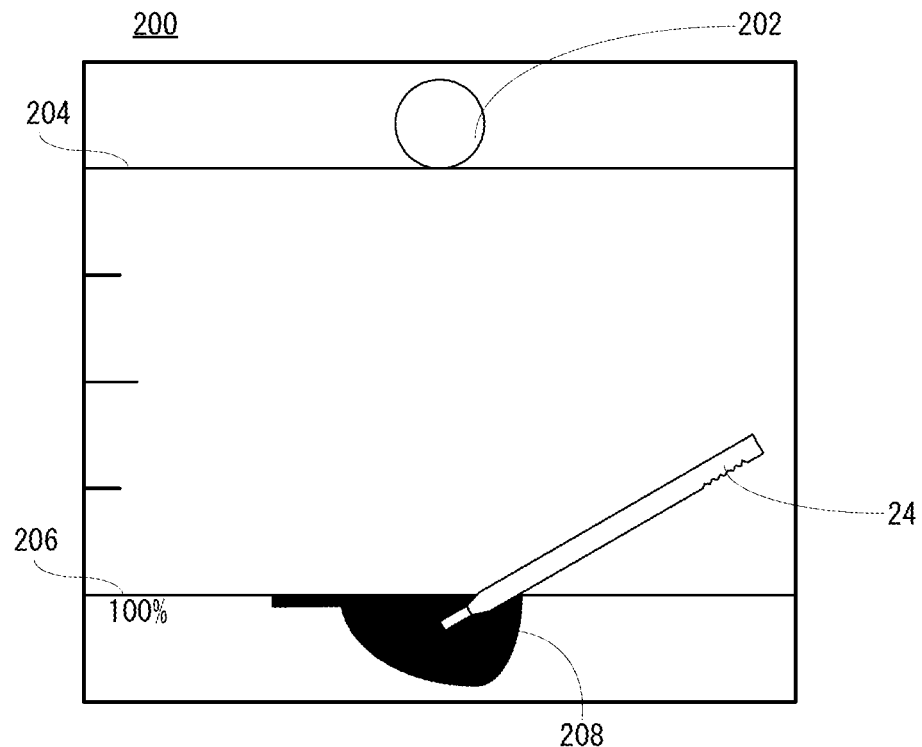
FIG. 9(A) is an illustration view showing a non-limiting example hitting operation screen of a case of the shot power value is 100%.

When the image 208 is slid to the full shot line 206 as shown in FIG. 9(A), for example, the shot power value is determined at 100%. In addition, even if the image 208 is slid downward beyond the full shot line 206, the shot power value does not exceed 100%. However, it may be judged as a miss shot in such a case. That is, it is possible to input a shot power value within a limit of 100%.

Figure 9B:
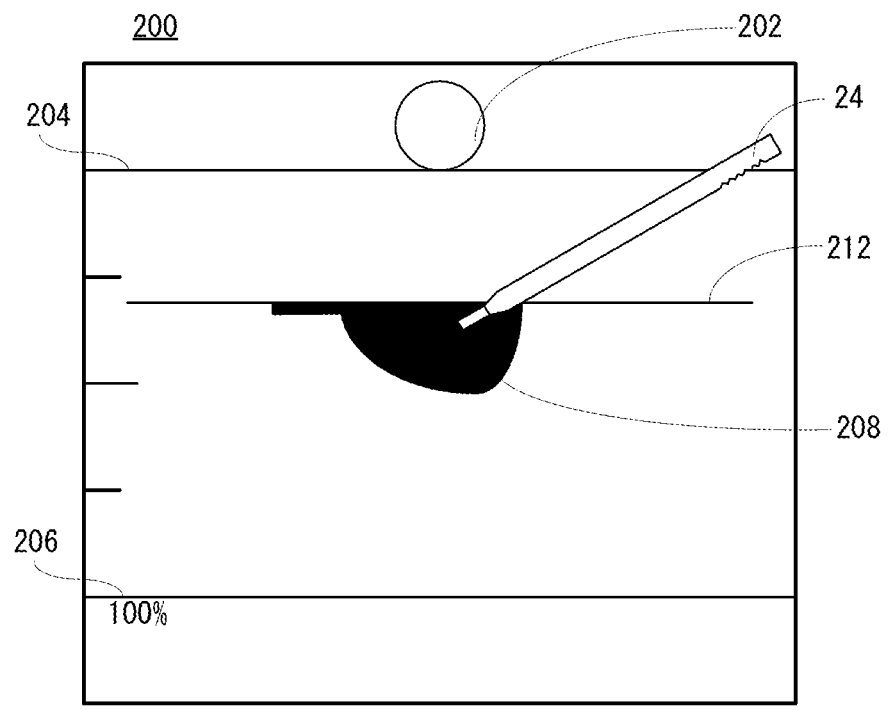
FIG. 9(B) is an illustration view showing a non-limiting example hitting operation screen of a case of the shot power value is 30%.

Moreover, as shown in FIG. 9(B), when the image 208 is slid to a position slightly below the scale corresponding to a shot power value of 25%, the shot power value is determined to be 30%. In addition, this shot power value is calculated as described above.

Figure 10:
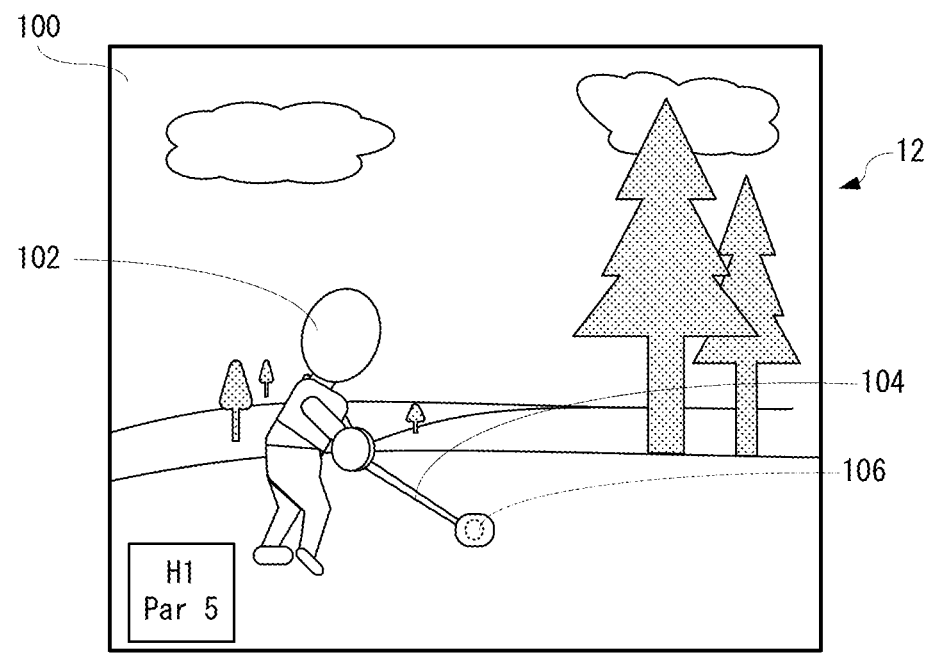
FIG. 10 is an illustration view showing still further non-limiting example game screen and hitting operation screen displayed on the display device of the game apparatus shown in FIG. 1.
Figure 10:
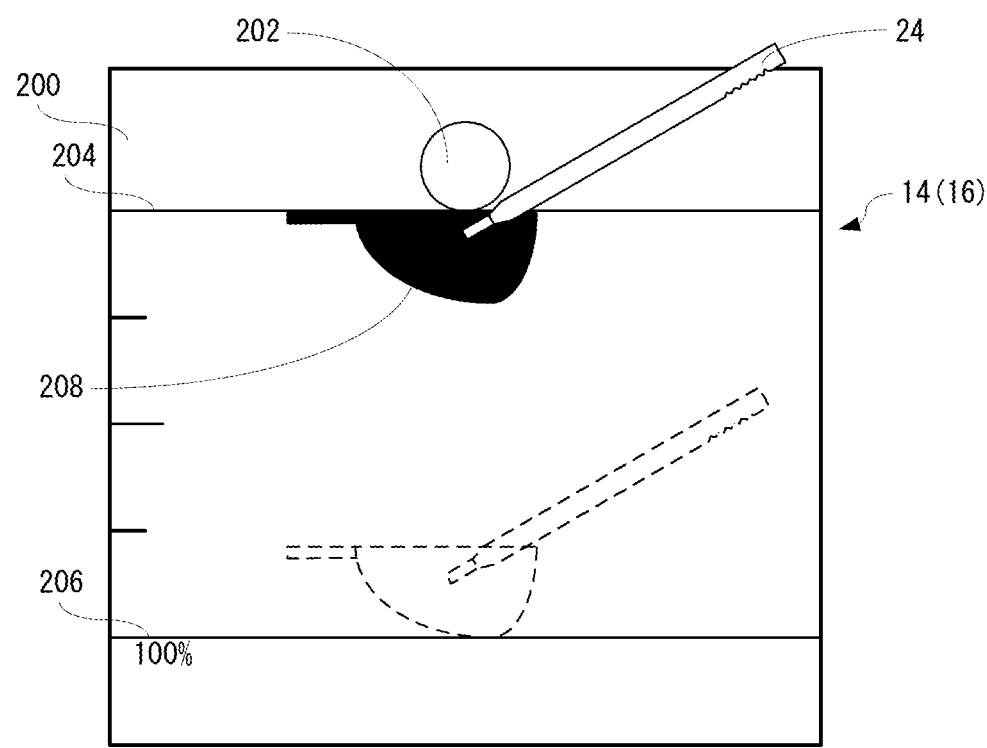

If the direction of the slide operation is reversed, the player performs the slide operation toward the impact line 204 (upward, in this embodiment) as shown in FIG. 10. Then, according to this slide operation, an animation that the player character 102 performs a downswing is displayed in the game screen 100 on the first LCD 12.

Although illustration is omitted, if the player continues the slide operation further upward and a touch position exceeds the impact line 204, in the game screen 100 on the first LCD 12, the player character 102 hits the ball 106. However, the player character 102 may hit the ball 106 when the image 208 is brought into contact with the target ball 202.

At this time, the shot power value having been previously determined is corrected according to a position where the touch position is brought into contact with the target ball 202. For example, the shot power value is reduced as the touch position is deviated from the center of the target ball 202. Since this is a mere example, it does not need to be limited to this, and various modifications are possible. Moreover, when the touch position is off the target ball 202 or when the image 208 reaches the impact line 204 without being brought into contact to the target ball 202, it is determined as a swing and a miss or a miss shot.

When the player character 102 hits the ball 106 according to the touch operation by the player, in the game screen 100 on the first LCD 12, a manner that the ball 106 is moved is displayed, and an animation that the player character 102 performs a follow-through and finishes the swing is displayed.

In parallel to such displaying processing, a movement trajectory of the ball 106 based on a result of the hitting operation by the player is calculated. At this time, a hitting angle (elevation angle θ) of the ball 106 determined by the loft angle or the like that is set for a type of the used club 104 and the initial velocity $v_0$ of the ball 106 that is determined based on the shot power value determined or/and corrected by the slide operation are used. In addition, at this time, a lie of the ball 106, a spin of the ball 106 and a wind or/and a rain of the course (hole) may be taken into account. Then, the ball 106 is moved in the virtual space according to the calculated movement trajectory. Although a detailed description is omitted, a run after landing or a movement by a backspin is also calculated.

FIG. 11 is an illustration view showing an example of a memory map 300 of the main memory 32 shown in FIG. 2. As shown in FIG. 11, the main memory 32 includes a program storage area 302 and a data storage area 304. The program storage area 302 is stored with a game program of the golf game of this embodiment, and the game program includes a game main processing program 302a, an image producing program 302b, an image displaying program 302c, a target landing point determining program 302d, a target shot power value calculating program 302e, a hitting processing program 302f, a ball moving program 302g, etc.

The game main processing program 302a is a program for processing a main routine of a virtual game (golf game, in the embodiment). The image producing program 302b is a program for producing game images corresponding to each of various kinds of screens (100, 120, 150, 200, etc.) using image producing data 304a described later. The image displaying program 302c is a program for displaying the game image produced according to the image producing program 302b on the first LCD 12 or/and the second LCD 14. Moreover, the image displaying program 302c displays game characters in motion (animation), or displays (expresses) a screen effect (direction) if needed.

The target landing point determining program 302d is a program for determining a position of the mark (target landing point) 122 at a position that the mark 122 is moved according to a touch operation by the player and then touched-off, or at a position that the ball 106 is landed in a case where the target shot power value is 100% on a straight line connecting a position that is touched-off and a current position of the ball 106.

The target shot power value calculating program 302e is a program for calculating, according to the equation (1), the target shot power value and the predicted movement trajectory 110 (124) in order to make the ball 106 land at the determined target landing point according to the target landing point determining program 302d. At this time, movement trajectory calculating data 304d is referred to.

The hitting processing program 302f is a program for hitting the ball 106 according to a touch operation of the player and for calculating a shot power value that is determined and corrected by the touch operation.

The ball moving program 302g is a program for calculating a movement trajectory of the ball 106 based on a result of the hitting operation by the player using the shot power value etc. calculated according to the hitting processing program 302f.

In addition, although illustration is omitted, a sound reproducing program and a backing-up program, etc. are stored in the program storage area 302. The sound reproducing program is a program for reproducing (outputting) a sound required for a game, such as game music (BGM), sounds (sound effect) and voices (imitation sounds). The backing-up program is a program for storing (saving) game data (intermediate data, result data) in the saving data memory 36 according to a predetermined event or an instruction of the player.

Moreover, the data storage area 304 is stored with the image producing data 304a, touch coordinate data 304b, terrain data 304c, movement trajectory calculating data 304d, ball position data 304e, mark position data 304f, predicted movement trajectory data 304g, target shot power value data 304h, hitting operation power data 304i, a resulting movement trajectory data 304j, etc.

The image producing data 304a is data (polygon data, texture data, etc.) for producing images of characters such as a player character 102, club 104 and ball 106, background objects like the course, holes, and so on. Moreover, data of the target ball 202, the impact line 204, the full shot line 206, the club head image 208, etc. for displaying the hitting operation screen 200 are also included.

The touch coordinate data 304b is touch coordinate data that is output from the touch panel 16 according to a touch operation by the player, and a plurality of touch coordinate data that are output from a touch-on to a touch-off are stored (temporarily stored) by the CPU 30. The touch coordinate data 304b is used at the time of performing the hitting processing (see FIG. 12-FIG. 16) described later, and eliminated after the hitting processing is ended.

The terrain data 304c is map data for the virtual golf game, and includes geometry of the course, height (high and low or undulation) or inclination of the ground at various points in the course, arranged positions of fairways, roughs, bare grounds, hazards, bunkers, greens (including green edges), trees, cart loads, etc. in the course, and other data.

The movement trajectory calculating data 304d includes a gravity acceleration (g) set in the virtual space, a mass (m) of the ball 106 in the virtual space, a loft angle (hitting angle (elevation angle θ) of the ball 106) for each type of the club 104, data about a flying distance (maximum arrival distance in the horizontal direction) when hitting the ball 106 with the shot power value of the full shot (100%) and the initial velocity $v_{0max}$ of the ball 106 when hitting the ball 106 with the shot power value of the full shot (100%).

In addition, although data about the loft angle (elevation angle θ) is included in the movement trajectory calculating data 304d as a parameter for each type of the club 104, it does not need to be limited to this. For example, other parameters, such as length, weight, etc. for each kind of the club 104 may be included. In such a case, the player is allowed to select a kind of the player character 102 wants to use for game play out of a plurality of kinds of player characters 102, and a head speed at the time of full shot is set to a value different for each player character 102, and head speed data for each player character 102 is also included in the movement trajectory calculating data 304d. In such a way, it is possible to calculate the initial velocity $v_{0max}$ of the ball 106 at the time of hitting the ball 106 with the shot power value of the full shot using a length or/and a weight of the club 104 in use and a head speed set for the player character 102 used for a game play. However, different values may be set for the head speed depending on not only the type of the player character 102 but the type of the club 104.

In addition, if weather such as wind or/and rain, a spin of the ball 106, a lie of the ball 106, etc. are taken into account in order to calculate the movement trajectory, these data are also included in the movement trajectory calculating data 304*d*.

The ball position data 304*e* is data of the current position (three-dimensional position) of the ball 106 in the virtual space. When the player character 102 appears in a start hole, or when the player character 102 moves to a next (different) hole, the current position of the ball 106 is moved (updated) to a predetermined position of a virtual tee ground, and when the ball 106 is hit, the current position of the ball 106 is moved (updated) according to the movement trajectory that is calculated based on the hitting operation. The mark position data 304*f* is data of a current position (three-dimensional position) of the mark 122 (target landing point) in the virtual space. However, when calculating the target landing point and the predicted movement trajectory 110 (124) according to the equation (1), the current position of the target landing point is changed into the local coordinate on the basis of the current position of the ball 106.

The predicted movement trajectory data 304*g* is data of the predicted movement trajectory 110 (124) calculated according to the target shot power value calculating program 302*e*. The target shot power value data 304*h* is data of the target shot power value calculated according to the target shot power value calculating program 302*e*.

The hitting operation power data 304*i* is data of a shot power value that is determined and corrected based on the result of the hitting operation by the player according to the hitting processing program 302*f*. A resulting movement trajectory data 304*j* is data on the movement trajectory (path) of the ball 106 calculated using the hitting operation power data 304*i* according to the ball moving program 304*g*.

In addition, although illustration is omitted, the data storage area 304 is also stored with sound data, other game data generated during the game, and flags.

Figure 12:
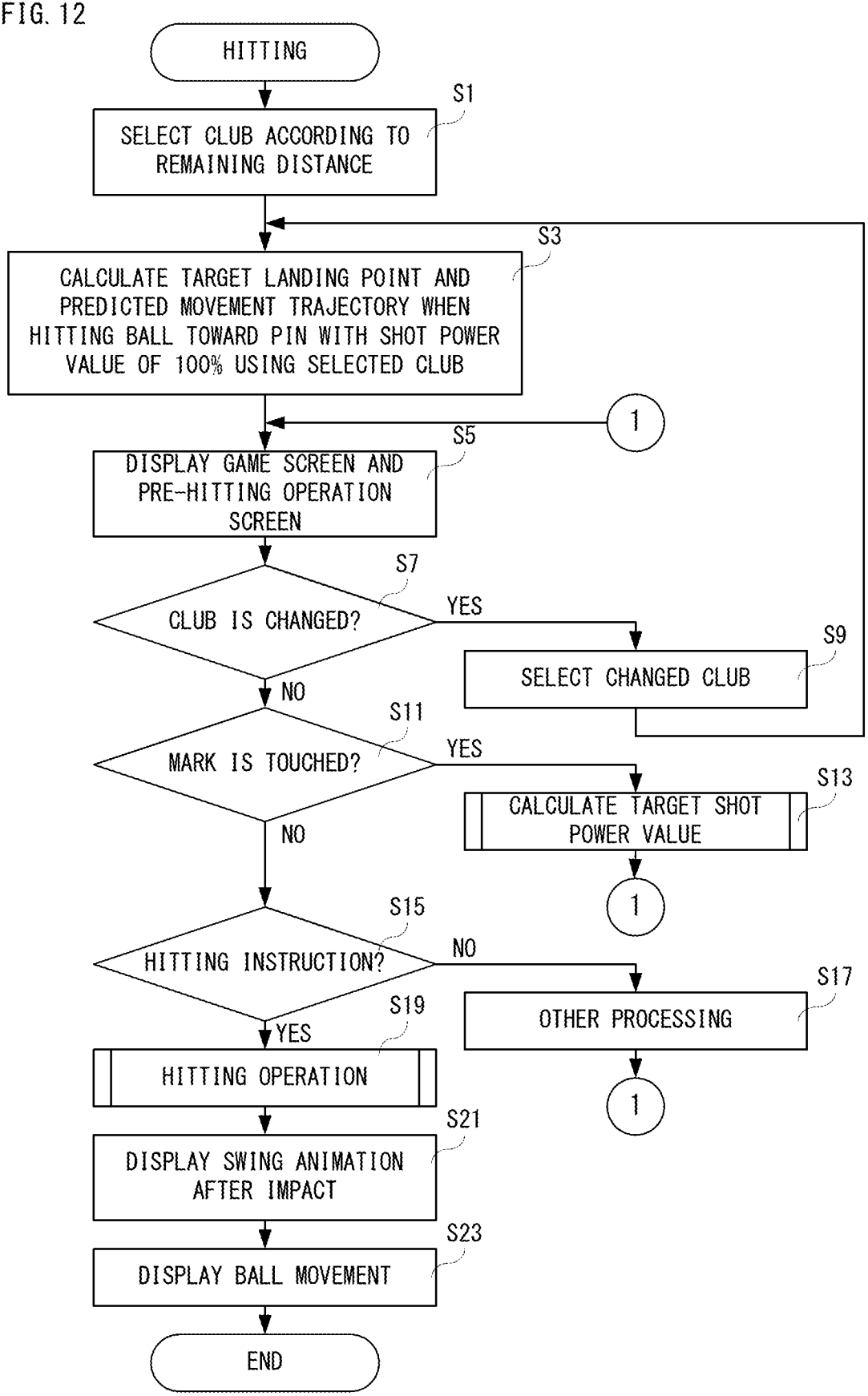
FIG. 12 is a flow chart showing non-limiting example hitting processing of a CPU of the game apparatus shown in FIG. 2.

FIG. 12 is a flow chart of hitting processing of the CPU 30 shown in FIG. 2. This hitting processing is performed at every time of causing the player character 102 to hit the ball 106. As shown in FIG. 12, when the hitting processing is started, the CPU 30 selects, in a step S1, the club 104 according to a remaining distance (distance from the current position of the ball 106 to the pin (cup)), and in a step S3, calculates, according to the equation (1), a target landing point and a predicted movement trajectory 110 (124) at the time of hitting the ball 106 with a shot power value of 100% in a direction of the pin with the club 104 concerned. At this time, the CPU 30 refers to the movement trajectory calculating data 304*d*.

In a next step S5, a pre-hitting operation screen 120 is displayed on the second LCD 14 while displaying a game screen 100 on the first LCD 12. Then, it is determined, in a step S7, whether there is any change of the club 104. Here, the CPU 30 determines whether the icon 130 is touched and thus the club 104 different from the club 104 that is currently selected is selected in the pre-hitting operation screen 120. More specifically, the CPU 30 determines whether a touch position indicated by the touch coordinate data 304*b* is included in a displaying area of the icon 130. In the following, this is the same for each case where it is determined whether an icon, an object or the like in a screen is touched.

If "YES" is determined in the step S7, that is, if there is a change of the club 104, the changed club 104 is selected in a step S9, and the process returns to the step S3. On the other hand, if "NO" is determined in the step S7, that is, if there is no change of the club 104, it is determined, in a step S11, whether the mark 122 is touched.

If "YES" is determined in the step S11, that is, if the mark 122 is touched, a target shot power value calculating processing (see FIG. 13 and FIG. 14) described later is performed in a step S13, and the process returns to the step S5. On the other hand, if "NO" is determined in the step S11, that is, if it is not a touch to the mark 122, it is determined, in a step S15, whether there is a hitting instruction. Here, the CPU 30 determines whether the icon 132 is touched in the pre-hitting operation screen 120.

If "NO" is determined in the step S15, that is, if there is no hitting instruction, further processing is performed in a step S17, and the process returns to the step S5. The further processing may be saving processing of the game data, etc. On the other hand, if "YES" is determined in the step S15, that is, if there is a hitting instruction, a hitting operation processing (see FIG. 15 and FIG. 16) described later is performed in a step S19, an animation of the swing after hitting by the player character 102 is displayed in the game screen 100 on the first LCD 12 in a step S21, and the ball 106 is moved according to a movement trajectory calculated and displayed in the game screen 100 on first LCD 12 in a step S23, and then, the hitting processing is ended. However, when the processing of the step S23 is performed, the current position (ball position data 304*e*) of the ball 106 is updated.

Figure 13:
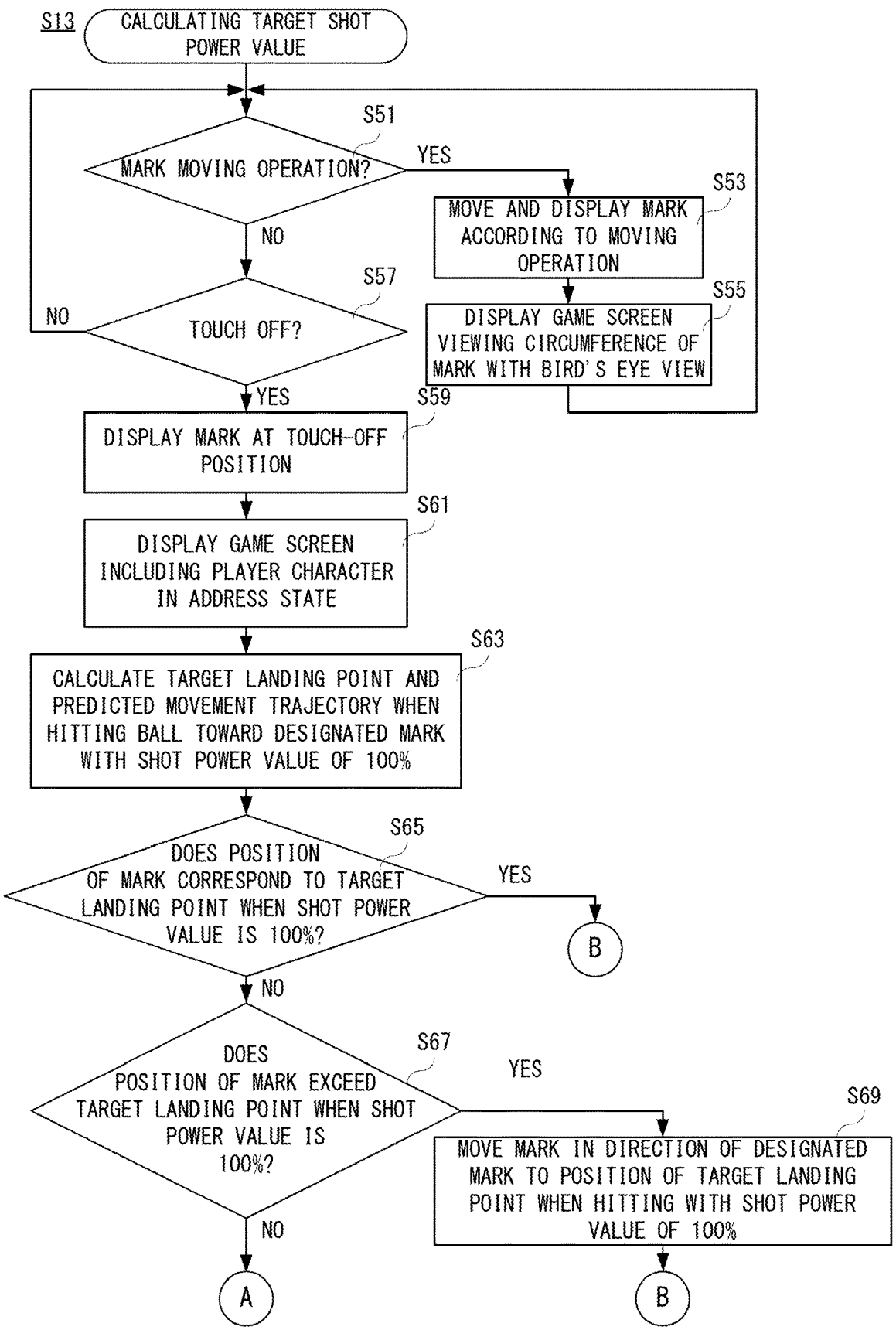
FIG. 13 is a flow chart showing a part of non-limiting example target shot power calculating processing of the CPU of the game apparatus shown in FIG. 2.
Figure 14:
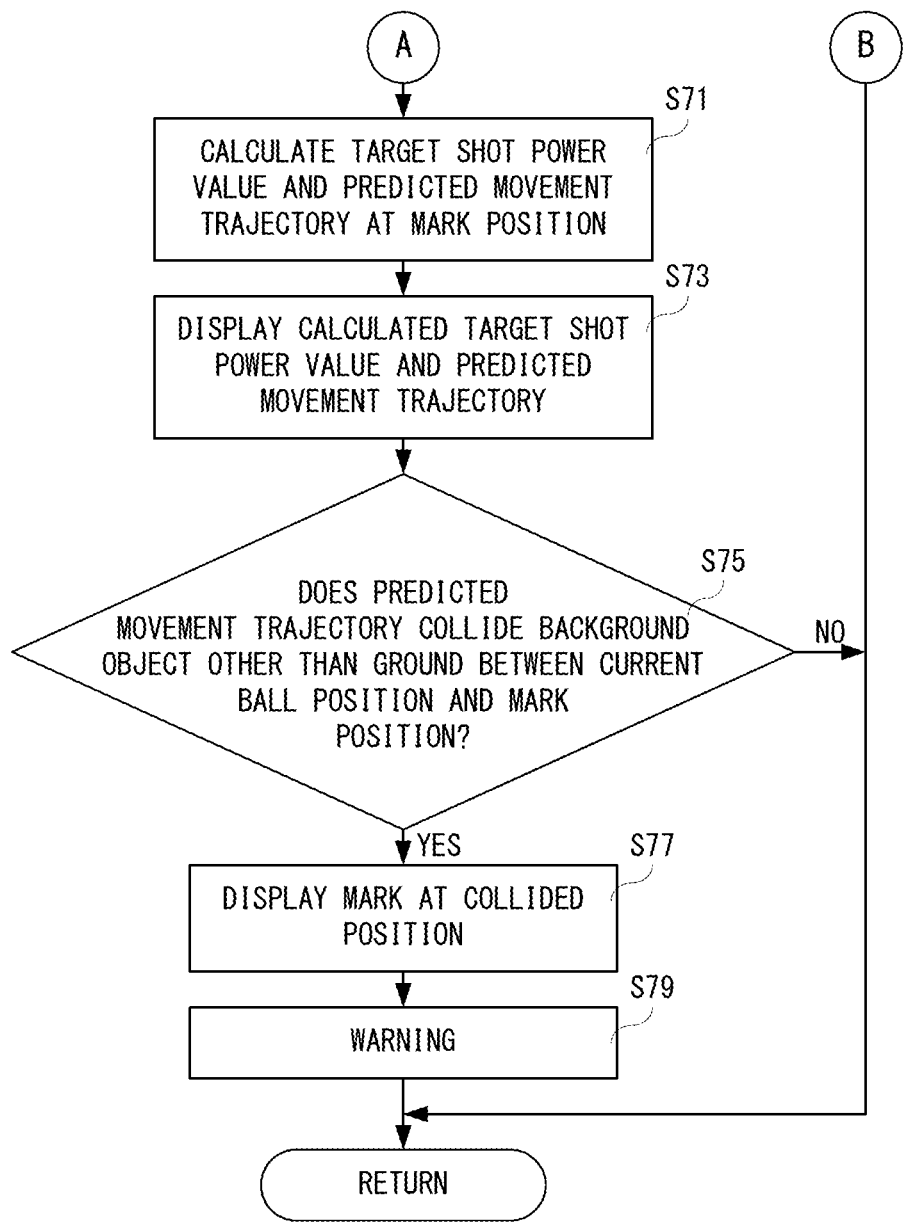
FIG. 14 is a flow chart showing another part of the non-limiting example target shot power calculating processing of the CPU of the game apparatus shown in FIG. 2, following FIG. 13.

FIG. 13 and FIG. 14 are flow charts of target shot power value calculating processing shown in the step S13 of FIG. 12. As shown in FIG. 13, if the target shot power value calculating processing is started, the CPU 30 determines, in a step S51, whether there is any moving operation of the mark 122. Here, the CPU 30 determines whether the mark 122 is slid.

If "YES" is determined in the step S51, that is, if there is a moving operation, the mark 122 is moved and displayed according to a moving operation in a step S53, and the game screen 150 viewing a circumference of the mark 122 in a bird's eye view is displayed on the first LCD 12 in a step S55, and the process returns to the step S51. In addition, the mark 122 may be moved by clicking (a touch-on and then a touch-off) a position of the mark 122 after movement.

On the other hand, if "NO" is determined in the step S51, that is, if there is no moving operation, it is determined, in a step S57, whether it is a touch-off. If "NO" is determined in the step S57, that is, if it is still in a touch-on, the process returns to the step S51. On the other hand, if "YES" is determined in the step S57, that is, if it is a touch-off, the mark 122 is displayed at a position of the touched-off in a step S59. That is, a position of the mark 122 is designated (determined) by the player. In a subsequent step S61, the game screen 100 viewing the player character 102 in an address state from back as shown in FIG. 3 is displayed on the first LCD 12.

In a next step S63, the CPU 30 calculates, according to the equation (1), a target landing point and a predicted movement trajectory 110 (124) at the time of hitting the ball 106 with the shot power value of 100% in a direction of the mark 122 designated by the player. Then, it is determined, in a step S65, whether the position of the mark 122 corresponds to the target landing point of a case of the shot power value is 100%.

If "YES" is determined in the step S65, that is, if the position of the mark 122 corresponds to the target landing point of the case of the shot power value of 100%, the target shot power value calculating processing is ended as shown in FIG. 14, and the process returns to the hitting processing.

On the other hand, if "NO" is determined in the step S65, that is, if the position of the mark 122 does not correspond to the target landing point of the case of the shot power value of 100%, it is determined, in a step S67, whether the position of the mark 122 exceeds the target landing point of the case of the shot power value of 100%.

If "YES" is determined in the step S67, that is, if the position of the mark 122 exceeds the target landing point of the case of the shot power value of 100%, the mark 122 is moved in a direction of the mark 122 that is designated by the player to the target landing point at the time of hitting the ball 106 with the shot power value of 100%, and the process returns to the hitting processing as shown in FIG. 14.

On the other hand, if "NO" is determined in the step S67, that is, if the position of the mark 122 does not exceed the target landing point of the case of the shot power value is 100%, as shown in FIG. 14, in a step S71, a target shot power value and a predicted movement trajectory 110 (124) at the position of the mark 122 are calculated according to the equation (1). In a subsequent step S73, the target shot power value and the predicted movement trajectory 124 that are calculated are displayed in the pre-hitting operation screen 120. That is, in the step S73, in the pre-hitting operation screen 120 as shown in FIG. 5, the indicator portion 128 written with the calculated target shot power value is displayed, and a part of the calculated predicted movement trajectory 124 is displayed. At this time, the calculated predicted movement trajectory 110 is also displayed in the game screen 100.

Then, it is determined, in a step S75, whether the predicted movement trajectory 110 collides with the background object other than the ground (including various hazards) between the current position of the ball 106 and the position of the mark 122. Since this collision determination is the same as usual collision determination in a virtual game, a description is omitted here.

If "NO" is determined in the step S75, that is, when the predicted movement trajectory 110 does not collide with the background object other than the ground between the current position of the ball 106 and the position of the mark 122, the process returns to the hitting processing. On the other hand, if "YES" is determined in the step S75, that is, when the predicted movement trajectory 110 collides with the background object other than the ground between the current position of the ball 106 and the position of the mark 122, the mark 122 is displayed, in a step S77, at a position where the predicted movement trajectory 110 collides, and the process returns to the hitting processing while issuing a warning as described above in a step S79.

Figure 15:
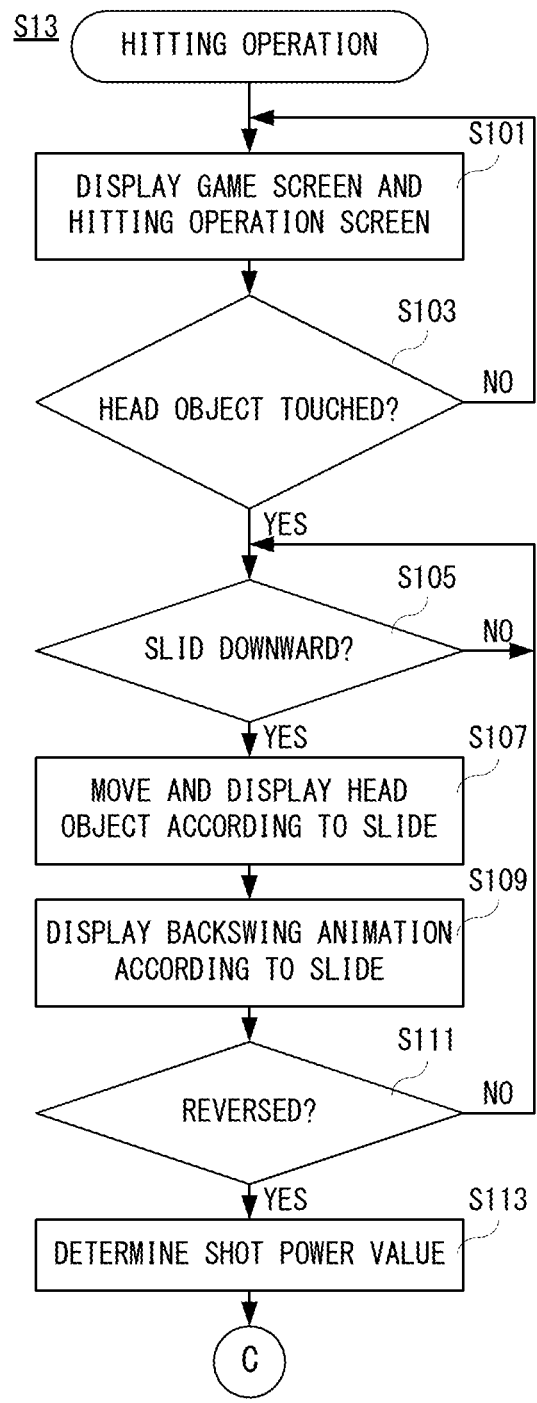
FIG. 15 is a flow chart showing a part of non-limiting example hitting operation processing of the CPU of the game apparatus shown in FIG. 2.
Figure 16:
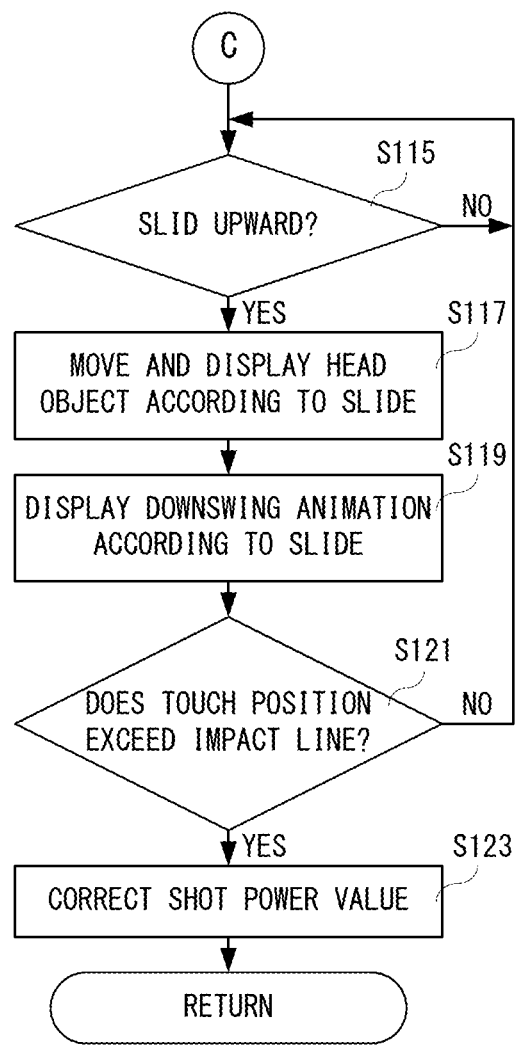
FIG. 16 is a flow chart showing another part of the non-limiting example hitting operation processing of the CPU of the game apparatus shown in FIG. 2, following FIG. 15.

FIG. 15 and FIG. 16 are flow charts showing the hitting operation processing in the step S19 shown in FIG. 12. As shown in FIG. 15, when the hitting operation processing is started, in a step S101, the CPU 30 displays a game screen 100 on the first LCD 12 and a hitting operation screen 200 on the second LCD 14 as shown in FIG. 7.

In a next step S103, it is determined whether the head object (image 208) is touched. If "NO" is determined in the step S103, that is, if the head object is not touched, the process returns to the step S101. On the other hand, if "YES" is determined in the step S103, that is, if the head object is touched, it is determined, in a step S105, whether the direction of the slide is downward. Here, the CPU 30 determines whether the touch position indicated by the touch coordinate data is changed so as to approach the full shot line 206.

If "NO" is determined in the step S105, that is, if the downward slide is not performed, the process returns to the step S105. However, even in this case, the image 208 may be moved according to the slide operation. This is the same also about a case where "NO" is determined in a step S115 described later.

On the other hand, if "YES" is determined in the step S105, that is, if slid downward, in a step S107, the head object is moved and displayed according to the slide in the hitting operation screen 200, and an animation of the backswing according to the slide is displayed in the game screen 100 in a step S109.

Then, it is determined, in a step S111, whether a direction of the slide is reversed. Here, the CPU 30 determines whether the touch position indicated by the touch coordinate data is begun to be changed so as to approach the impact line 204. However, the CPU 30 may determine whether a changing speed of the touch position becomes 0 (zero) in the slide direction.

If "NO" is determined in the step S111, that is, if the direction of the slide is not reversed, the process returns to the step S105. On the other hand, if "YES" is determined in the step S111, that is, if the direction of the slide is reversed, a shot power value is determined in a step S113. In this embodiment, as described above, the CPU 30 determines the shot power value by the slide operation based on the touch position indicated by the touch coordinate data at the time that the direction of the slide is changed.

As shown in FIG. 16, in a subsequent step S115, it is determined whether the direction of the slide is upward. Here, the CPU 30 determines whether the touch position indicated by the touch coordinate data is changed so as to approach the impact line 204.

If "NO" is determined in the step S115, that is, if the upward slide is not performed, the process returns to the same step S115. On the other hand, if "YES" is determined in the step S115, that is, if slid upward, in a step S117, the head object is moved and displayed according to the slide in the hitting operation screen 200, and an animation of the downswing according to the slide in the game screen 100 in a step S119.

Then, in a step S121, it is determined whether the touch position exceeds the impact line 204. Here, the CPU 30 determines whether the touch position is above the impact line 204. If "NO" is determined in the step S121, that is, if the touch position does not exceed the impact line 204, the process returns to the step S115. On the other hand, if "YES" is determined in the step S121, that is, if the touch position exceeds the impact line 204, the shot power value is corrected in a step S123, and the process returns to the hitting processing shown in FIG. 12 after ending the hitting operation processing.

As described above, in the step S123, the shot power value that is determined in the step S113 is reduced according to a deviated amount from the center of the target ball 202. However, when the touch position is off the target ball 202, it is determined as a swing and a miss or a miss shot.

According to this embodiment, since the target shot power value and the predicted movement trajectory corresponding to the current position of the ball and the terrain of the designated position are calculated if the target landing point is designated, it is possible to operate so as to hit the ball with the target shot power value while designating directly a position that the player wants to cause the ball to arrive. That is, the target position of the ball object after movement can be set by a simple operation.

In addition, although the mark is moved to a position at the time of the maximum value of the target shot power and on a straight line that connects the current position of the ball and the position of the mark after movement when the target shot power value exceeds the maximum value in a case of designating the target landing point, the mark may be returned to the position before movement.

Moreover, although the target landing point is designated in this embodiment, a target arrival point may be designated. In such a case, when calculating the predicted movement trajectory, a run after landing or a movement by a backspin is taken into account, and an influence affected by a state of a lie and an influence affected by wind or/and rain during movement of the ball are taken into account. Therefore, the mark can be referred to as directing or designating a target position like the target landing point or the target arrival point.

Furthermore, in this embodiment, a case where a hitting operation is performed by a slide operation on the touch panel 16 is described, but another method may be adopted for the hitting operation. Like the game apparatus shown as the background art (US 2004/0180709 A1, for example), a player may operate a manual operating button (A button) three times in a hitting operation. In such a case, for example, if a target landing point is set and a target shot power value is calculated by moving a mark positon, and a position of a power target marker is changed and a value of the calculated target shot power value or a flying distance according to the target shot power value is displayed on this power target marker in the hitting operation screen.

However, in the game apparatus shown as the background art, a first operation is a shot start operation, a second operation is a power determination operation and a third operation is an impact location determination operation. If the player performs the shot start operation, a cursor located in a square hit point of a hit area within a power gauge is moved toward a left at a prescribed speed. If the player performs the power determination operation before the cursor reaches at a left end of the power gauge, a position of the cursor at that time is set as a shot power, and a moving direction of the cursor is reversed, and the cursor is moved to a right direction at a prescribed speed. Then, if the player performs the impact location determination operation when the cursor reaches in the hit area, a movement of the ball is controlled based on the set shot power and the determined impact location.

Moreover, in this game apparatus, when the power determination operation is performed, the power that becomes larger is set as the cursor position is closer to the left edge, and the power of 100% is set when the cursor position and the left edge of the power gauge are in agreement, and the power that is decreased with a prescribed rate is set as the cursor moves the right away from the left edge.

Moreover, in this game apparatus, the player can set the target value of the shot power to perform a hitting at a stage before the shot operation to less than 100% by performing an operation of the operating button (R button). For example, the target value of the power to perform the hitting is decreased from 100% the prescribed rate at every time that the R button is operated, and the position where the power target marker is displayed is changed according to it. A flying distance when the hitting is performed with the target power value is displayed on this power target marker.

Moreover, in another example, a hitting operation can be performed by swinging an input device including a motion sensor such as an acceleration sensor. In such a case, the player who holds the input device by hands operates to actually perform a golf swing, for example, the shot power value is determined by a backswing amount, and it is determined that the impact is performed at a point that the acceleration becomes maximum.

In addition, displaying the power gauge, movement of the cursor and displaying the target shot power value are the same as those of the game apparatus of the background art described above. However, the cursor is moved according to a swing operation of the player.

Moreover, although a case of using a portable game apparatus in this embodiment is described, it is needless to say that it can also be applied to other devices such as stationary game apparatus, desktop PC and arcade game apparatus. Moreover, it is applicable to other portable apparatus such as a notebook PC, PDA, cellular phone, smartphone, tablet PC, etc. If a pointing device such as a touch panel is also provided in a case where an arbitrary apparatus is used, designation the target landing point is simple.

Moreover, although a CPU(s) incorporated in the game apparatus performs all processing in this embodiment, it does not need to be limited to this. A system that a part or all of the processing is performed by another apparatus such as a server that is provided so as to be able to communicate with the game apparatus and a plurality of apparatuses jointly perform the processing may be configured.

Furthermore, the structure of the game apparatus shown in this embodiment is mere exemplification, and should not be limited, and can be changed suitably according to an actual product. For example, the number of LCDs may be made one (1), and a single displaying area thereof may be divided into two (2). Otherwise, by using a single LCD, and a game screen and an operation screen may be displayed by switching the LCD. Moreover, it may be provided with touch panels on two LCDs.

Furthermore, when the same effect (result) can be acquired, an order of respective steps shown in the flow charts may be changed suitably.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A golf game apparatus, comprising:
   a non-transitory computer-readable storage medium for storing a program for controlling a golf game;
   at least one computer processor for executing the program such that the golf game apparatus is at least configured to:
   display a map of a part of a golf course;
   display in an operation screen a mark for designating a target position of a ball object after movement in a virtual space;
   receive input corresponding to operation by a player;
   perform a determination which determines a position of the mark according to the received input corresponding to the operation by the player;
   perform a first power calculation which calculates, when the position of the mark is determined by the determination, a target shot power for moving the ball object to the position of the mark concerned, using the determined position of the mark and a parameter that is set for a club object under selection and taking into account undulation of a terrain in the virtual space;

display the target shot power that is calculated by the first power calculation in a visibly-confirmable manner; and control an operation of the golf game using the target shot power, wherein the received input comprises a touch input on a part of the operation screen which corresponds to the displayed map so as to define the position of the mark on the displayed map.

2. The golf game apparatus according to claim 1, wherein the golf game apparatus is further configured to: perform an adjustment which adjusts the position of the mark when the target shot power that is calculated by the first power calculation exceeds a maximum value.

3. The golf game apparatus according to claim 2, wherein the adjustment moves the mark to a landing point or arrival position on a straight line that connects a current position of the ball object and the position of the mark at the time of hitting the ball object concerned by the target shot power of the maximum value using a club object.

4. The golf game apparatus according to claim 1, further comprising a touch panel, wherein the determination moves the position of the mark according to a touch operation to the touch panel.

5. The golf game apparatus according to claim 4, wherein the golf game apparatus is further configured to:

cause a player character to hit the ball object according to a slide operation that is performed by the player so as to be reciprocated on the touch panel; and cause the player character to perform a swing motion in conjunction with the slide operation.

6. The golf game apparatus according to claim 5, wherein the golf game apparatus is further configured to: perform a second power calculation which calculates an actual shot power that causes the player character to hit the ball object according to a straight distance between a position where a slide direction is reversed in the slide operation and a hitting reference line.

7. A non-transitory computer-readable storage medium storing a golf game control program to be executed by a computer provided with a display device to provide a golf game, wherein the golf game control program causes one or more processors of the computer to perform:

displaying a map of a part of a golf course;

displaying, in an operation screen displayed on the display device, a mark for designating a target position of a ball object after movement in a virtual space;

receiving input corresponding to operation by a player;

determining a position of the mark according to the received input corresponding to the operation by the player;

calculating, when the position of the mark is determined in the determining, a target shot power for moving the ball object to the position of the mark concerned, using the determined position of the mark and a parameter that is set for a club object under selection and taking into account undulation of a terrain in the virtual space;

displaying the target shot power that is calculated in the calculating in a visibly-confirmable manner on the display device; and controlling an operation of the golf game using the target shot power, wherein the received input comprises a touch input on a part of the operation screen which corresponds to the displayed map so as to define the position of the mark on the displayed map.

8. The non-transitory computer-readable storage medium according to claim 7, wherein the golf game control program causes the one or more processors of the computer to further perform adjusting the position of the mark when the target shot power that is calculated by the calculating exceeds a maximum value.

9. The non-transitory computer-readable storage medium according to claim 8, wherein the adjusting is performed so as to move the mark to a landing point or arrival position on a straight line that connects a current position of the ball object and the position of the mark at the time of hitting the ball object concerned by the target shot power of the maximum value using a club object.

10. The non-transitory computer-readable storage medium according to claim 7, wherein the computer further comprises a touch panel, and the determining is performed so as to move the position of the mark according to a touch operation to the touch panel.

11. The non-transitory computer-readable storage medium according to claim 10, wherein the golf game control program causes the one or more processors of the computer to further perform causing a player character to hit the ball object according to a slide operation that is performed by the player so as to be reciprocated on the touch panel; and causing the player character to perform a swing motion in conjunction with the slide operation.

12. The non-transitory computer-readable storage medium according to claim 11, wherein the golf game control program causes the one or more processors of the computer to further perform calculating an actual shot power that causes the player character to hit the ball object according to a straight distance between a position where a slide direction is reversed in the slide operation and a hitting reference line.

13. A golf game system, comprising:

a non-transitory computer-readable storage medium for storing a program for controlling a golf game;

at least one computer processor for executing the program such that the golf game apparatus is at least configured to:

display a map of a part of a golf course;

display, in an operation screen a mark for designating a target position of a ball object after movement in a virtual space;

receive input corresponding to operation by a player;

perform a determination which determines a position of the mark according to the received input corresponding to the operation by the player;

perform a first calculation which calculates, when the position of the mark is determined by the determination, a target shot power for moving the ball object to the position of the mark concerned, using the determined position of the mark and a parameter that is set for a club object under selection and taking into account undulation of a terrain in the virtual space;

display the target shot power that is calculated in the calculating in a visibly-confirmable manner; and control an operation of the golf game using the target shot power, wherein the received input comprises a touch input on a part of the operation screen which corresponds to the displayed map so as to define the position of the mark on the displayed map.

14. A golf game control method using a computer provided with a display device to provide a golf game, wherein the computer performs following steps:

(a) displaying a map of a part of a golf course, and displaying, in an operation screen displayed on the display device, a mark for designating a target position of a ball object after movement in a virtual space;
(b) receiving input corresponding to operation by a player;
(c) determining a position of the mark according to the received input corresponding to the operation of the player;
(d) calculating, when the position of the mark is determined, a target shot power for moving the ball object to the position of the mark concerned, using the determined position of the mark and a parameter that is set for a club object under selection and taking into account undulation of a terrain in the virtual space;
(e) displaying the target shot power that is calculated in the step (c) in a visibly-confirmable manner on the display device; and
(f) controlling an operation of the golf game using the target shot power,
wherein the received input comprises a touch input on a part of the operation screen which corresponds to the displayed map so as to define the position of the mark on the displayed map.

* * * * *